United States Patent
Elliott et al.

(10) Patent No.: US 11,283,508 B2
(45) Date of Patent: Mar. 22, 2022

(54) MILLIMETER WAVE BEAM TRACKING AND BEAM SWEEPING

(71) Applicant: Intel Corporation, Santa Clara, CA (US)

(72) Inventors: Brent Elliott, Hillsboro, OR (US); Benjamin Grewell, Portland, OR (US); Tom Harel, Shefayim (IL); Junyoung Nam, Sunnyvale, CA (US); Hosein Nikopour, San Jose, CA (US); Oner Orhan, San Jose, CA (US); Susruth Sudhakaran, Beaverton, OR (US); Shilpa Talwar, Cupertino, CA (US); Ping Wang, San Jose, CA (US); Liang Xian, Portland, OR (US); Xiaodi Zhang, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/040,457

(22) PCT Filed: Jun. 29, 2018

(86) PCT No.: PCT/US2018/040447
§ 371 (c)(1),
(2) Date: Sep. 22, 2020

(87) PCT Pub. No.: WO2020/005296
PCT Pub. Date: Jan. 2, 2020

(65) Prior Publication Data
US 2021/0028850 A1    Jan. 28, 2021

(51) Int. Cl.
*H04B 7/06* (2006.01)
*H04B 7/08* (2006.01)

(52) U.S. Cl.
CPC .......... *H04B 7/0695* (2013.01); *H04B 7/088* (2013.01)

(58) Field of Classification Search
CPC ....... H04B 7/0695; H04B 7/088; Y02D 30/70
See application file for complete search history.

(56) References Cited

U.S. PATENT DOCUMENTS 10,517,061 B1 * 12/2019 Kumar ................. H04B 7/088
2017/0238294 A1    8/2017 Lim et al.
(Continued)

FOREIGN PATENT DOCUMENTS

WO    WO-2017063614 A2    4/2017

OTHER PUBLICATIONS

"International Application Serial No. PCT/US2018/040447, International Search Report dated Mar. 21, 2019", 3 pgs.
(Continued)

*Primary Examiner* — Kenneth T Lam
(74) *Attorney, Agent, or Firm* — Schwegman Lundberg & Woessner, P.A.

(57) ABSTRACT

Aspects of mmWave beam tracking and beam sweeping are described, for example, spatial searching operations, directional beam forming, complex channel measurement operations, and adaptive power savings. Some aspects include using priori information for mmWave beam tracking and beam sweeping. Some aspects include using priori information to modify a superset of beam criteria to obtain a subset of beam criteria, select a spatial region according to the subset of beam criteria, and initiate a spatial searching operation within the spatial region for establishing a communication link. Some aspects include obtaining complex channel measurements of beams and combining the measurements with priori information to determine a beam for use in a communication link. Some aspects include provid-
(Continued)

ing signals from $N_r$ over $K_1$ input/output (IO) links and receiving signals over $K_1$ IO links, and combining signals received over the $K_1$ IO links, using a compression matrix, to generate signals over K IO links.

20 Claims, 20 Drawing Sheets

(56) References Cited

U.S. PATENT DOCUMENTS

| | | |
|---|---|---|
| 2018/0059769 A1 | 3/2018 | Sripathi et al. |
| 2018/0176065 A1* | 6/2018 | Deng .............. H04B 7/088 |
| 2019/0037529 A1* | 1/2019 | Edge .............. H04W 16/28 |
| 2019/0191397 A1* | 6/2019 | Pan ............... H04B 7/0695 |

OTHER PUBLICATIONS

"International Application Serial No. PCT/US2018/040447, Written Opinion dated Mar. 21, 2019", 8 pgs.
Gek, Hong Sim, et al., "5G Millimeter-Wave and D2D Symbiosis: 60 GHz for Proximity-based Service", IEEE Wireless Communications 24(4), DOI: 10.1109/MWC, (Aug. 2016).
Yong, Niu, et al., "Device-to-Device Communications Enabled Energy Efficient Multicast Scheduling in mmWave Small Cell", arXiv:1712.05130vl [cs.NI], (Dec. 14, 2017).
"International Application Serial No. PCT/US2018/040447, International Preliminary Report on Patentability dated Jan. 7, 2021", 10 pgs.

\* cited by examiner

MILLIMETER WAVE BEAM TRACKING AND BEAM SWEEPING

This application is a U.S. National Stage Filing under 35 U.S.C. 371 from International Application No. PCT/US2018/040447, filed Jun. 29, 2018 and published in English as WO 2020/005296 on Jan. 2, 2020, which is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including new radio (NR) networks. Other aspects are directed to techniques, methods and apparatuses for spatial searching complex channel measurements, directional beam forming and adaptive power savings operations.

BACKGROUND

Next-generation (5G and beyond) systems will make use of Massive Multiple Input Multiple Output (MIMO) architecture and millimeter wave (mmWave) operations. Fully digital receiver architecture can help user equipment (UE) achieve low latency in such systems. However, fully digital receivers may exhibit high power consumption relative to analog and hybrid receivers. Thus, reducing power consumption and achieving high energy efficiency can be beneficial to improving the usability of fully digital receivers in cellular systems.

Improving antenna directivity of antennas (e.g., antenna arrays) within wireless devices and infrastructure devices can reduce interference and increase spatial reuse capacity. This is achieved, in part, through the formation of highly-directional transmissions between respective transmitters and receivers in such wireless devices and infrastructure devices within a wireless communication network. These improvements in antenna directivity become especially important when a wireless communication network is densified. Directional transmissions are often desirable for wireless communications within mmWave and centimeter wave (mmWave) frequency bands, as directional transmissions can achieve higher gains that help compensate for signal attenuation due to the intrinsic propagation characteristics of signals at mmWave and cmWave frequencies.

An antenna array, including a plurality of antenna elements, can be used to form narrow beams with high pin to compensate for signal attenuation. Beamforming can achieve alignment of narrow beams between a transmitter and a receiver to establish and maintain a directional wireless communication link. In contrast to omnidirectional transmission, a directional communication link setup includes initially searching different spatial regions to detect the directional synchronization signals and/or other information and performing an access and/or association procedure through beamforming. Spatial searching and access and/or association procedures introduce extra latency and overhead that increases significantly when the number of narrow beams increases, which can be prohibitively resource intensive. Multi-stage codebook-based beamforming reduces the directional link setup time by breaking a beamforming procedure down into multiple searching stages using different resolution beams such as quasi-omni beam, sector level beam and high-resolution beam. At each searching stage, the best beam pair with that stage's beam resolution is found by searching all the beam pair combinations within the space region covered by the best beam pair with lower beam resolution found from the previous stage. If the number of quasi-omni beams, the number of sector level beams within each quasi-omni beam, or the number of beams within each sector beam is large, the directional link setup using multi-stage codebook beamforming still takes time and consumes power and signaling overhead.

Several approaches exist for optimal beam selection. In beamforming operations, a sector-level sweep is a common approach for optimal beam selection in commercial applications. A sector-level sweep may involve evaluating a finite number of pre-defined beams to select a beam that performs best. However, this approach suffers from balancing a high overhead of evaluating many beams with a lack of achieved optimality when an optimal beam falls between the finite beams evaluated. Another approach is to leverage out-of-band evaluation of a geometric position of a remote endpoint. These existing solutions are especially suboptimal in conditions with high multipah, significant scattering, and non-line-of-sight operation. Under these conditions, even a significant number of evaluated beams is likely to identify a substantially suboptimal beam.

BRIEF DESCRIPTION OF THE DRAWINGS

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

Figure 1:
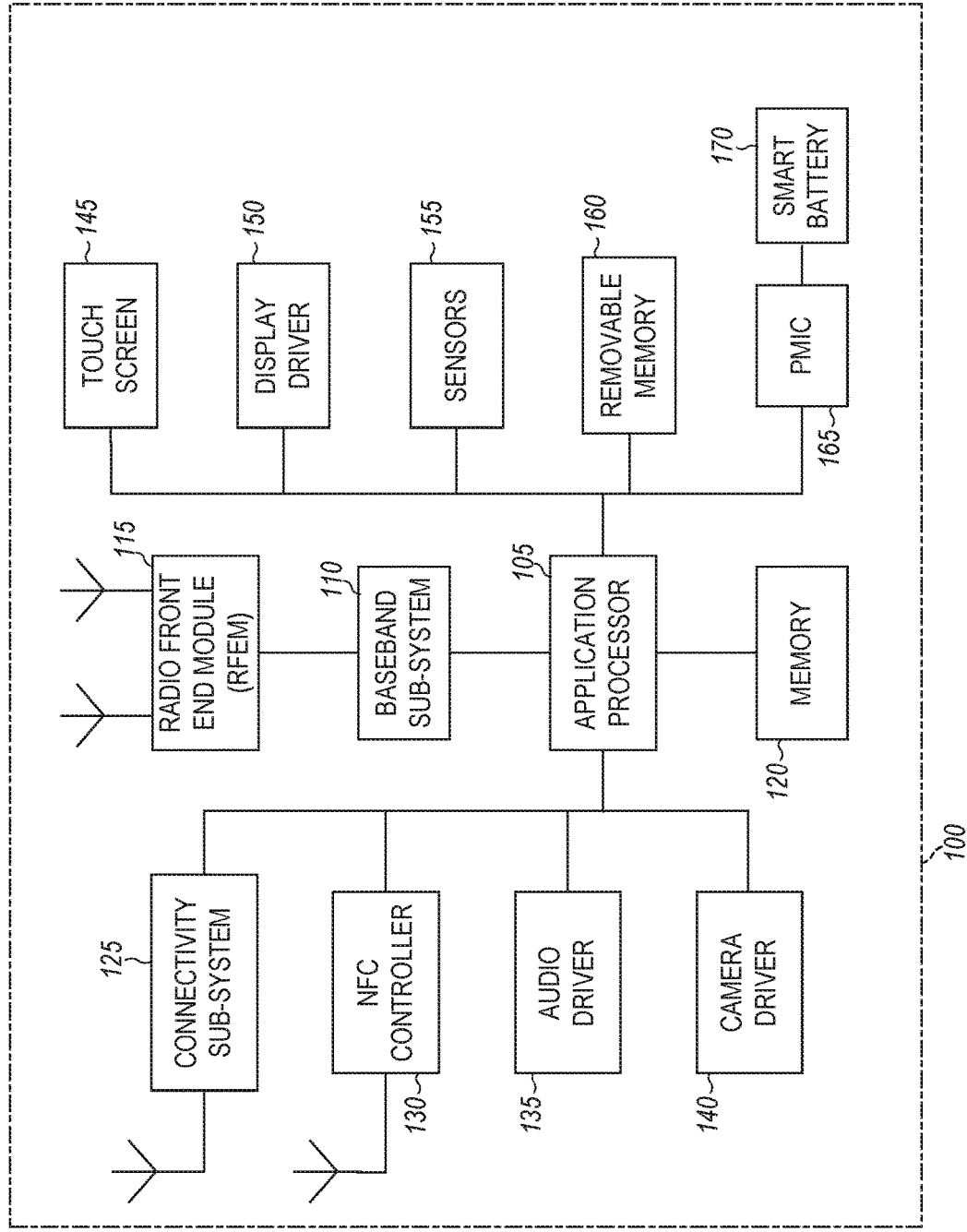
FIG. 1 illustrates an exemplary user device according to some aspects.

FIG. 1 illustrates an exemplary user device according to some aspects. The user device 100, in some aspects, may be configured for spatial searching operations and directional beam forming using priori information. In certain aspects, the device 100 may also be configured for adaptive power savings and complex channel measurement operations for beam forming and for device and/or system calibration. The user device 100 may be a mobile device in some aspects and includes an application processor 105, baseband processor 110 (also referred to as a baseband sub-system), radio front end module (RFEM) 115, memory 120, connectivity subsystem 125, near field communication (NFC) controller 130, audio driver 135, camera driver 140, touch screen 145, display driver 150, sensors 155, removable memory 160, power management integrated circuit (PMIC) 165, and smart battery 170.

In some aspects, application processor 105 may include, for example, one or more central processing unit (CPU) cores and one or more of cache memory, low drop-out voltage regulators (LDOs), interrupt controllers, serial interfaces such as SPI, I2C or universal programmable serial interface sub-system, real time clock (RTC), timer-counters including interval and watchdog timers, general purpose IO, memory card controllers such as SDNIMC or similar, USB interfaces, MIPI interfaces, and/or Joint Test Access Group (JTAG) test access ports.

In some aspects, baseband processor 110 may be implemented, for example, as a solder-down substrate including one or more integrated circuits, a single packaged integrated circuit soldered to a main circuit board, and/or a multi-chip module including two or more integrated circuits.

Applications of mmWave technology can include, for example, WiGig and future 5G, but the mmWave technology can be applicable to a variety of telecommunications systems. The mmWave technology can be especially attractive for short-range telecommunications systems. WiGig devices operate in the unlicensed 60 GHz band, whereas 5G mmWave is expected to operate initially in the licensed 28 GHz and 39 GHz bands. A block diagram of an example baseband sub-system 110 and RFEM 115 in a mmWave system is shown in FIG. 1A.

Figure 1A:
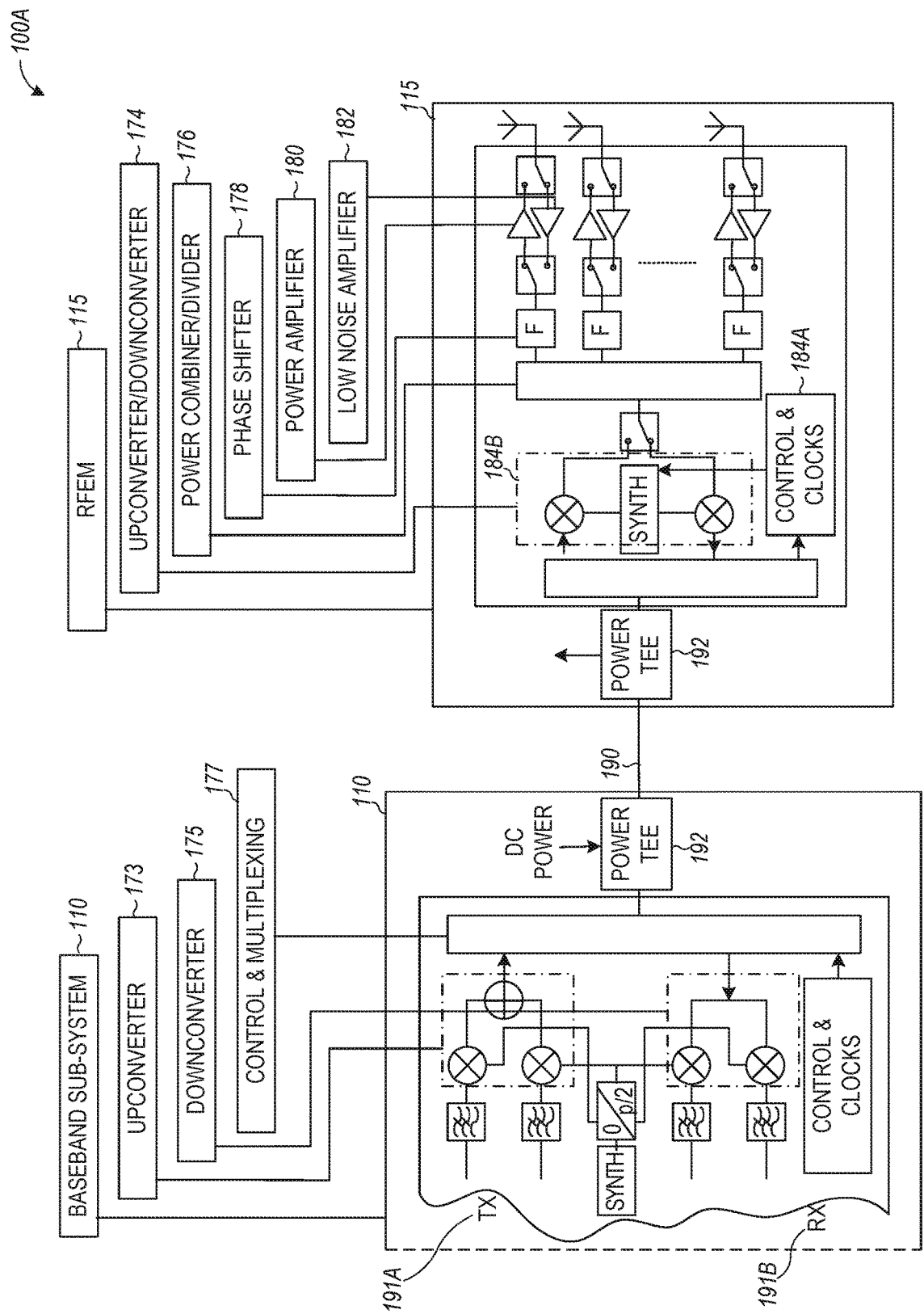
FIG. 1A illustrates a mmWave system, which can be used in connection with the device of FIG. 1 according to some aspects.

FIG. 1A illustrates a mmWave system 100A, which can be used in connection with the device 100 of FIG. 1 according to some aspects of the present disclosure, including the directional beam forming operations, adaptive power saving operations, and complex channel measurement operations described herein. The system 100A includes two components: a baseband sub-system 110 and one or more radio front end modules (RFEM s) 115. The RFEM 115 can be connected to the baseband sub-system 110 by a single coaxial cable 190, which supplies a modulated intermediate frequency (IF) signal, DC power, clocking signals and control signals.

The baseband sub-system 110 is not shown in its entirety, but FIG. 1A rather shows an implementation of analog front end. This includes a transmitter (TX) section 191A with an up converter 173 to intermediate frequency (IF) (around 10 GHz in current implementations), a receiver (RX) section 191B with down-conversion 175 from IF to baseband, control and multiplexing circuitry 177 including a combiner to multiplex/demultiplex transmit and receive signals onto a single cable 190. In addition, power tee circuitry 192 (which includes discrete components) is included on the baseband circuit board to provide DC power for the RFEM 115. In some aspects, the combination of the TX section and RX section may be referred to as a transceiver, to which may be coupled one or more antennas or antenna arrays of the types described herein.

The RFEM 115 can be a small circuit board including a number of printed antennas and one or more RF devices containing multiple radio chains, including up-conversion/down-conversion 174 to millimeter wave frequencies, power combiner/divider 176, programmable phase shifting 178 and power amplifiers (PA) 180, low noise amplifiers (LNA) 182, as well as control and power management circuitry 184A and 184B. This arrangement can be different from Wi-Fi or cellular implementations, which generally have all RF and baseband functionality integrated into a single unit and only antennas connected remotely via coaxial cables.

This architectural difference can be driven by the very large power losses in coaxial cables at millimeter wave frequencies. These power losses can reduce the transmit power at the antenna and reduce receive sensitivity. To avoid this issue, in some aspects, PAs 180 and LNAs 182 may be moved to the RFEM 115 with integrated antennas. In addition, the RFEM 115 may include up-conversion/down-conversion 174 so that the IF signals over the coaxial cable 190 can be at a lower frequency. Additional system context for mmWave 5G apparatuses, techniques and features is discussed herein below.

Figure 2:
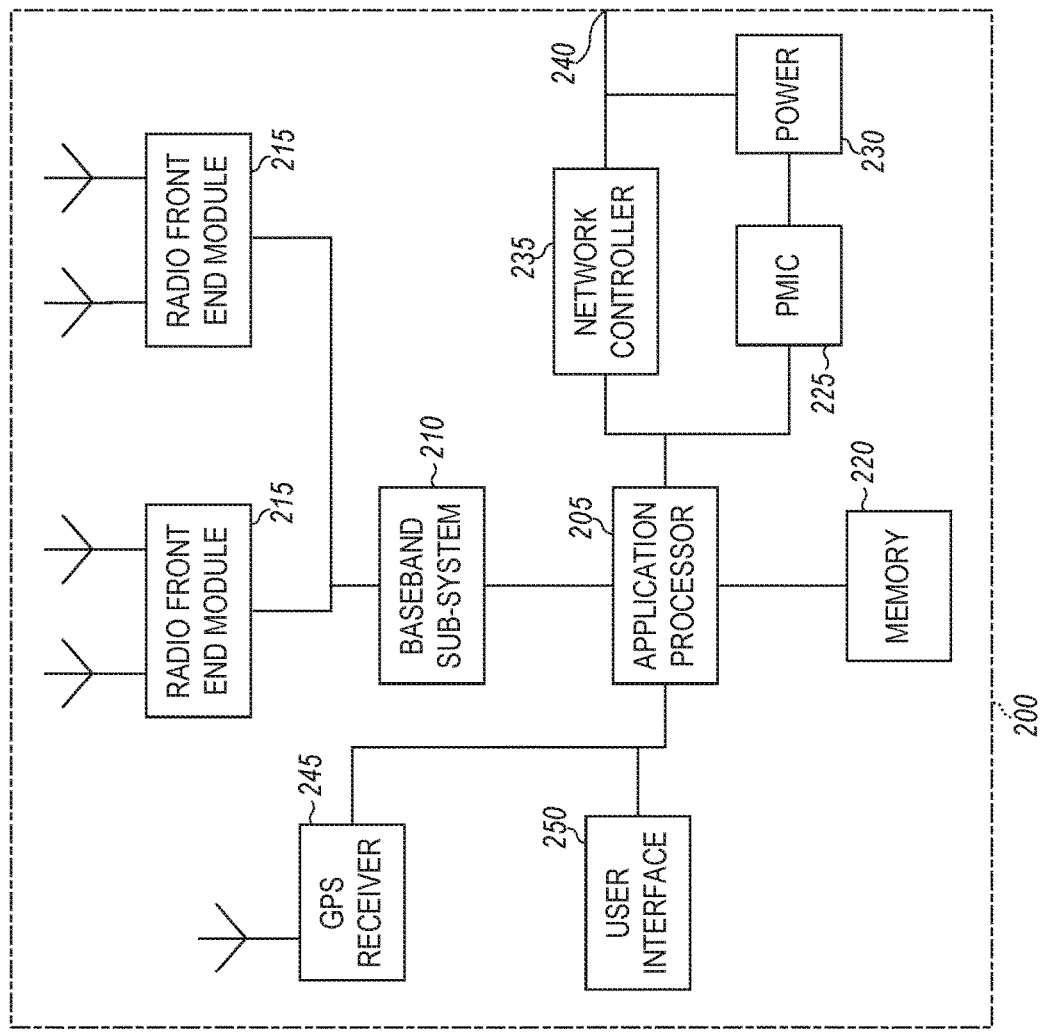
FIG. 2 illustrates an exemplary base station radio head according to some aspects.

FIG. 2 illustrates an exemplary base station or infrastructure equipment radio head according to some aspects. A base station may be termed, for example, an Evolved Node-B (eNB, eNodeB), or a New Radio Node-B (gNB, gNodeB). The base station radio head 200, in some aspects, may be configured for spatial searching operations and directional beam forming using priori information, for example, the base station radio head 200 may be configured to form one or more (e.g., directional) wireless communication links with a remote device (e.g., UE) and transmit priori information to the remote device via the links, as discussed in more detail below. In certain aspects, the base station radio head 200 may also be configured for adaptive power savings operations and for complex channel measurement operations. In some aspects, the base station radio head 200 may include one or more of application processor 205, baseband processors 210, one or more radio front end modules 215, memory 220, power management integrated circuitry (PMIC) 225, power tee circuitry 230, network controller 235, network interface connector 240, satellite navigation receiver (e.g., GPS receiver) 245, and user interface 250.

In some aspects, application processor 205 may include one or more CPU cores and one or more of cache memory, low drop-out voltage regulators (LDOs), interrupt controllers, serial interfaces such as SPI, I²C or universal programmable serial interface, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 210 may be implemented, for example, as a solder-down substrate including one or more integrated circuits, a single packaged integrated circuit soldered to a main circuit board or a multi-chip sub-system including two or more integrated circuits.

In some aspects, memory 220 may include one or more of volatile memory including dynamic random access memory (DRAM) and/or synchronous DRAM (SDRAM), and non-volatile memory (NVM) including high-speed electrically erasable memory (commonly referred to as Flash memory), phase-change random access memory (PRAM), magneto-resistive random access memory (MRAM), and/or a three-dimensional cross point memory. Memory 220 may be implemented as one or more of solder down packaged integrated circuits, socketed memory modules and plug-in memory cards.

In some aspects, power management integrated circuitry 225 may include one or more of voltage regulators, surge protectors, power alarm detection circuitry and one or more backup power sources such as a battery or capacitor. Power alai m detection circuitry may detect one or more of brown out (under-voltage) and surge (over-voltage) conditions.

In some aspects, power tee circuitry 230 may provide for electrical power drawn from a network cable. Power tee circuitry 230 may provide both power supply and data connectivity to the base station radio head 200 using a single cable.

In some aspects, network controller 235 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver 245 may include circuitry to receive and decode signals transmitted by one or more navigation satellite constellations such as the global positioning system (GPS), Globalnay a Navigatsionnay a Sputnikovay a Sistema (GLONASS), Galileo and/or BeiDou. The receiver 245 may provide, to application processor 205, data which may include one or more of position data or time data. Time data may be used by application processor 205 to synchronize operations with other radio base stations or infrastructure equipment.

In some aspects, user interface 250 may include one or more of buttons. The buttons may include a reset button. User interface 250 may also include one or more indicators such as LEDs and a display screen.

Figure 3A:
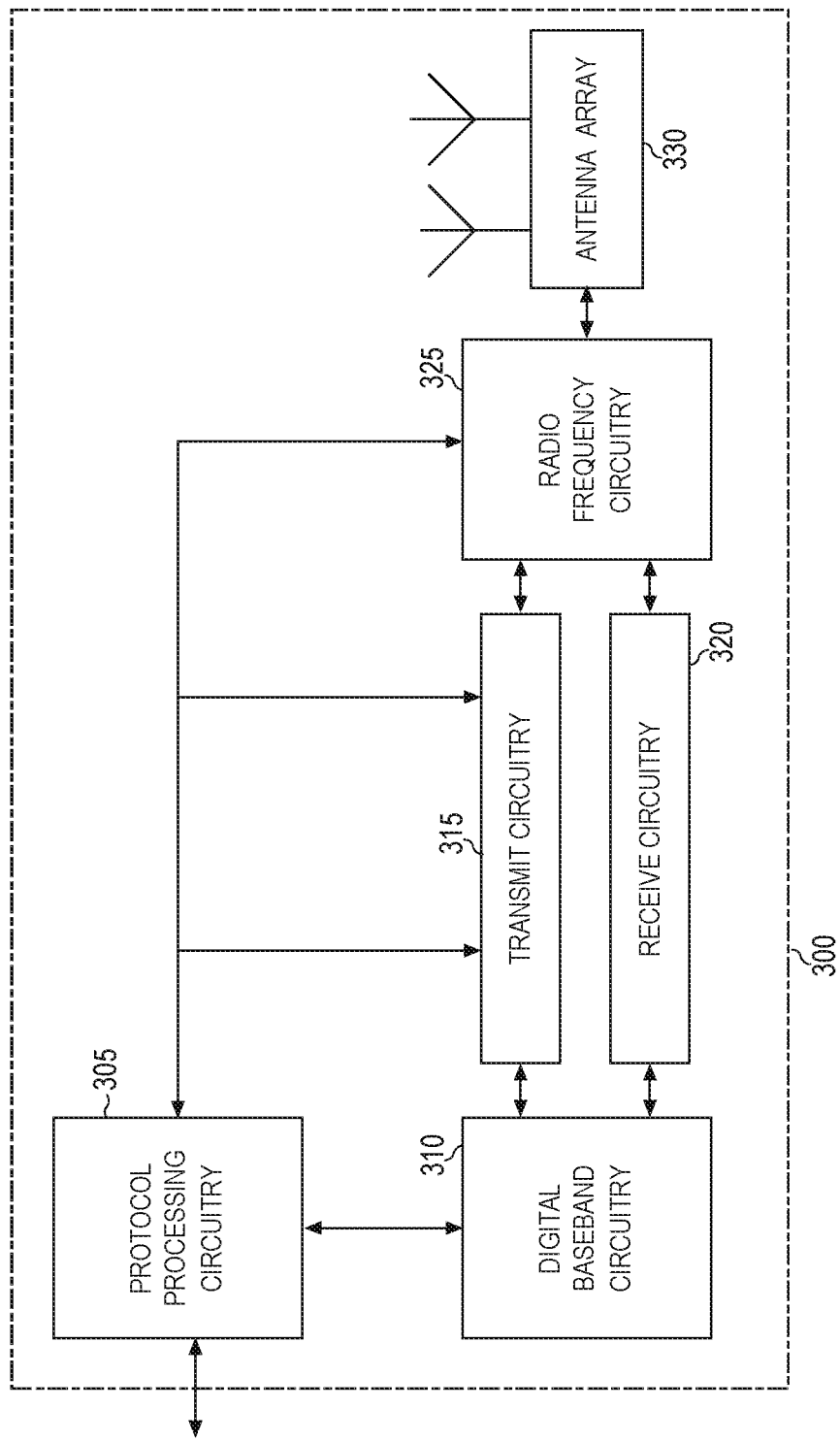
FIG. 3A illustrates exemplary millimeter wave communication circuitry according to some aspects.
Figure 3B:
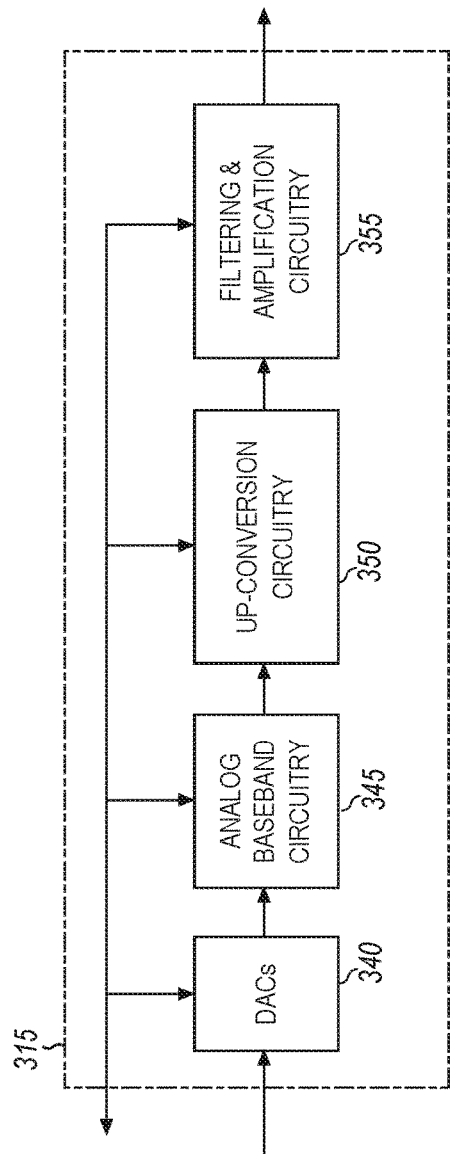
FIG. 3B illustrates aspects of exemplary transmit circuitry illustrated in FIG. 3A according to some aspects.
Figure 3C:
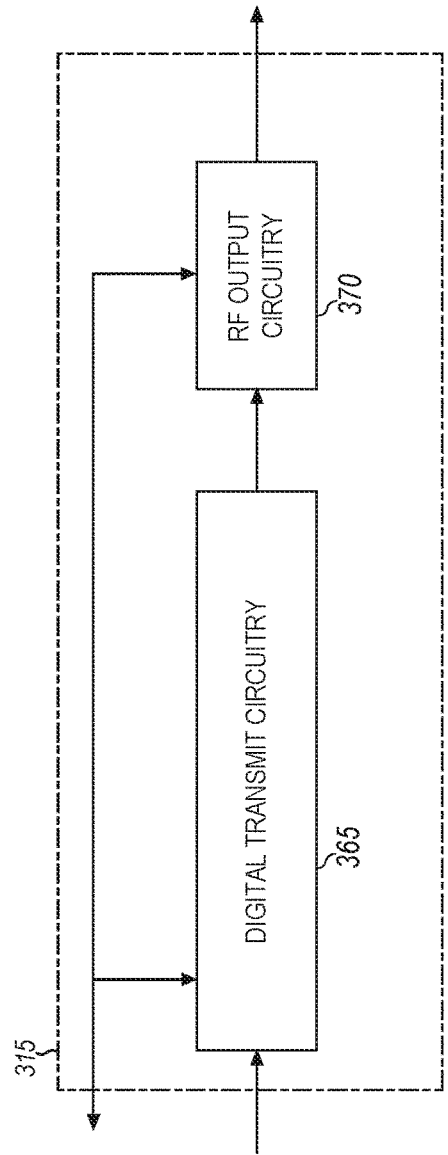
FIG. 3C illustrates aspects of exemplary transmit circuitry illustrated in FIG. 3A according to some aspects.
Figure 3D:
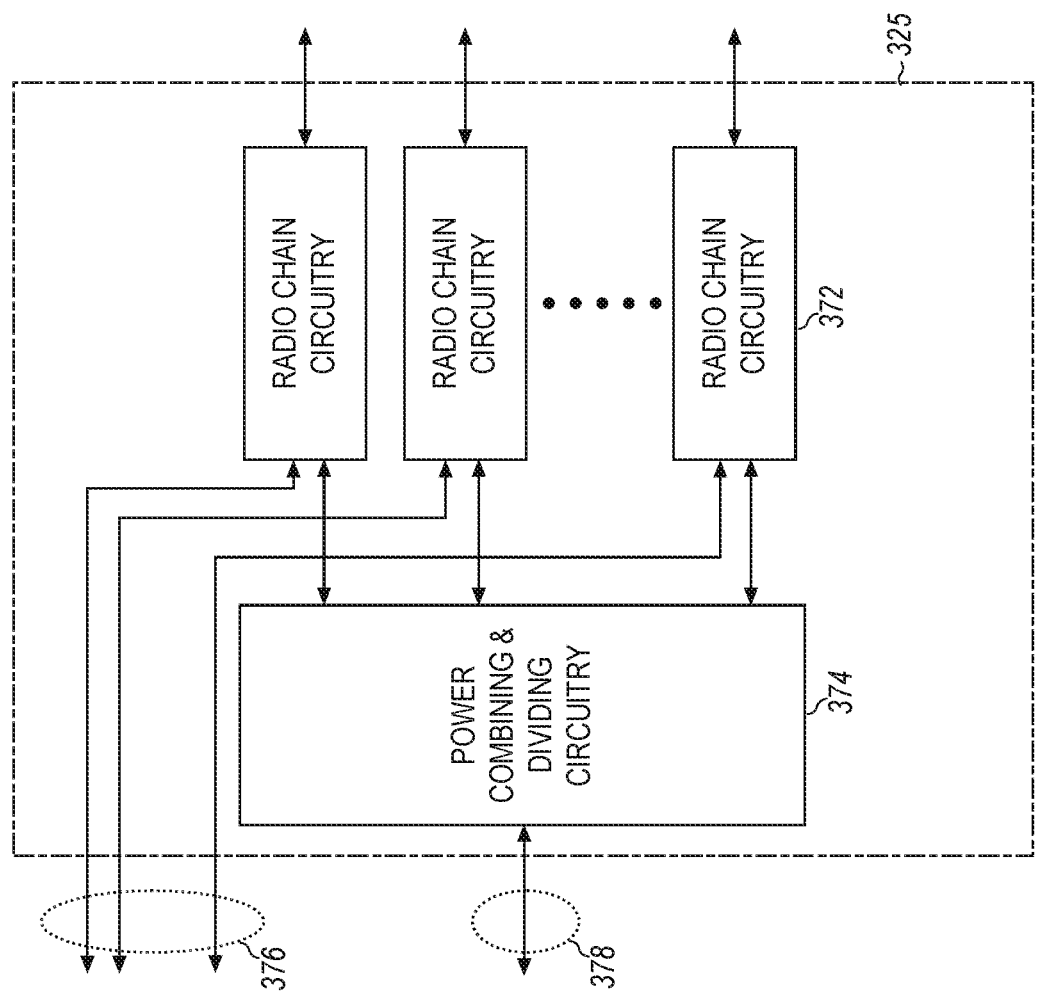
FIG. 3D illustrates aspects of exemplary radio frequency circuitry illustrated in FIG. 3A according to some aspects.
Figure 3E:
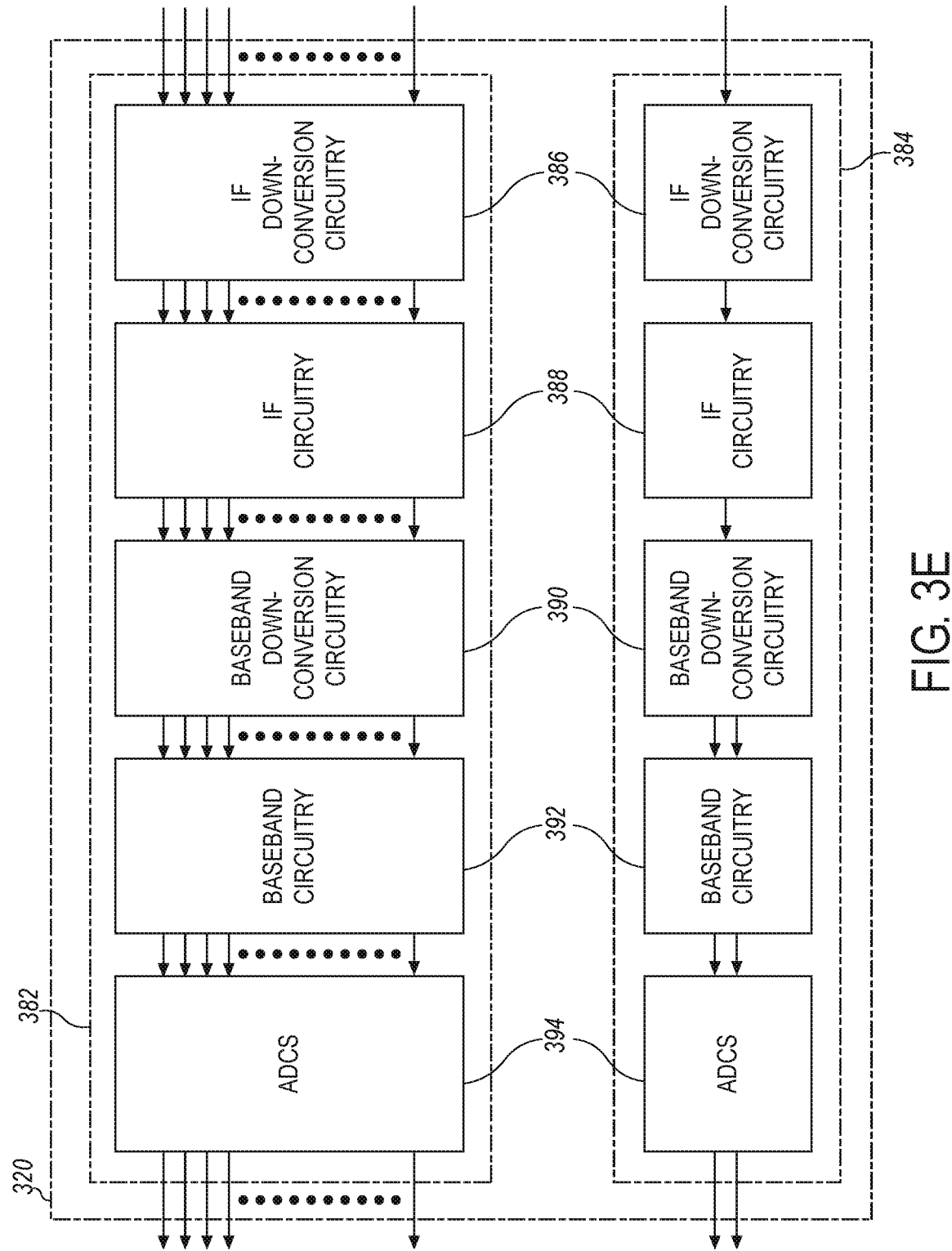
FIG. 3E illustrates aspects of exemplary receive circuitry in FIG. 3A according to some aspects.

FIG. 3A illustrates exemplary mmWave communication circuitry according to some aspects; FIGS. 3B and 3C illustrate aspects of transmit circuitry shown in FIG. 3A according to some aspects; FIG. 3D illustrates aspects of radio frequency circuitry shown in FIG. 3A according to some aspects; FIG. 3E illustrates aspects of receive circuitry in FIG. 3A according to some aspects. Millimeter wave communication circuitry 300 shown in FIG. 3A may be alternatively grouped according to functions. Components illustrated in FIG. 3A are provided here for illustrative purposes and may include other components not shown in FIG. 3A.

Millimeter wave communication circuitry 300 may include protocol processing circuitry 305 (or processor) or other means for processing. Protocol processing circuitry 305 may implement one or more of medium access control (MAC), radio link control (RLC), packet data convergence protocol (PDCP), radio resource control (RRC) and non-access stratum (NAS) functions, among others. Protocol processing circuitry 305 may include one or more processing cores to execute instructions and one or more memory structures to store program and data information.

Millimeter wave communication circuitry 300 may further include digital baseband circuitry 310. Digital baseband circuitry 310 may implement physical layer (PHY) functions including one or more of hybrid automatic repeat request (HARQ) functions, scrambling and/or descrambling, coding and/or decoding layer mapping and/or de-mapping modulation symbol map ping received symbol and/or bit metric determination, multi-antenna port pre-coding and/or decoding which may include one or more of space-time, space-frequency or spatial coding reference signal generation and/or detection, preamble sequence generation and/or decoding synchronization sequence generation and/or detection, control channel signal blind decoding and other related functions.

Millimeter wave communication circuitry 300 may further include transmit circuitry 315, receive circuitry 320 and/or antenna array circuitry 330. Millimeter wave communication circuitry 300 may further include RF circuitry 325. In some aspects, RF circuitry 325 may include one or multiple parallel RF chains for transmission and/or reception. Each of the RF chains may be connected to one or more antennas of antenna array circuitry 330.

In some aspects, protocol processing circuitry 305 may include one or more instances of control circuitry. The control circuitry may provide control functions for one or more of digital baseband circuitry 310, transmit circuitry 315, receive circuitry 320, and/or RF circuitry 325.

FIGS. 3B and 3C illustrate aspects of transmit circuitry shown in FIG. 3A according to some aspects. Transmit circuitry 315 shown in FIG. 3B may include one or more of digital to analog converters (DACs) 340, analog baseband circuitry 345, up-conversion circuitry 350 and/or filtering and amplification circuitry 355. DACs 340 may convert digital signals into analog signals. Analog baseband circuitry 345 may perform multiple functions as indicated below. Up-conversion circuitry 350 may up-convert baseband signals from analog baseband circuitry 345 to RF frequencies (e.g., mmWave frequencies). Filtering and amplification circuitry 355 may filter and amplify analog signals. Control signals may be supplied between protocol processing circuitry 305 and one or more of DACs 340, analog baseband circuitry 345, up-conversion circuitry 350 and/or filtering and amplification circuitry 355.

Transmit circuitry 315 shown in FIG. 3C may include digital transmit circuitry 365 and RF circuitry 370. In some aspects, signals from filtering and amplification circuitry 355 may be provided to digital transmit circuitry 365. As above, control signals may be supplied between protocol processing circuitry 305 and one or more of digital transmit circuitry 365 and RF circuitry 370.

FIG. 3D illustrates aspects of radio frequency circuitry shown in FIG. 3A according to some aspects. Radio frequency circuitry 325 may include one or more instances of radio chain circuitry 372, which in some aspects may include one or more filters, power amplifiers, low noise amplifiers, programmable phase shifters and power supplies.

Radio frequency circuitry 325 may also in some aspects include power combining and dividing circuitry 374. In some aspects, power combining and dividing circuitry 374 may operate bidirectionally, such that the same physical circuitry may be configured to operate as a power divider when the device is transmitting and as a power combiner when the device is receiving. In some aspects, power combining and dividing circuitry 374 may include one or more wholly or partially separate circuitries to perform power dividing when the device is transmitting and power combining when the device is receiving. In some aspects, power combining and dividing circuitry 374 may include passive circuitry including one or more two-way power divider/combiners arranged in a tree. In some aspects, power combining and dividing circuitry 374 may include active circuitry including amplifier circuits.

In some aspects, radio frequency circuitry 325 may connect to transmit circuitry 315 and receive circuitry 320 in FIG. 3A. Radio frequency circuitry 325 may connect to transmit circuitry 315 and receive circuitry 320 via one or more radio chain interfaces 376 and/or a combined radio chain interface 378. In some aspects, one or more radio chain interfaces 376 may provide one or more interfaces to one or more receive or transmit signals, each associated with a single antenna structure. In some aspects, the combined radio chain interface 378 may provide a single interface to one or more receive or transmit signals, each associated with a group of antenna structures.

FIG. 3E illustrates aspects of receive circuitry in FIG. 3A according to some aspects. Receive circuitry 320 may include one or more of parallel receive circuitry 382 and/or one or more of combined receive circuitry 384. In some aspects, the one or more parallel receive circuitry 382 and one or more combined receive circuitry 384 may include one or more Intermediate Frequency (IF) down-conversion circuitry 386, IF processing circuitry 388, baseband down-conversion circuitry 390, baseband processing circuitry 392 and analog-to-digital converter (ADC) circuitry 394. As used herein, the term "intermediate frequency" refers to a frequency to which a carrier frequency (or a frequency signal) is shifted as in intermediate step in transmission, reception, and/or signal processing. IF down-conversion circuitry 386 may convert received RF signals to IF. IF processing circuitry 388 may process the IF signals, e.g., via filtering and amplification. Baseband down-conversion circuitry 390 may convert the signals from IF processing circuitry 388 to baseband. Baseband processing circuitry 392 may process the baseband signals, e.g., via filtering and amplification. ADC circuitry 394 may convert the processed analog baseband signals to digital signals.

Figure 4:
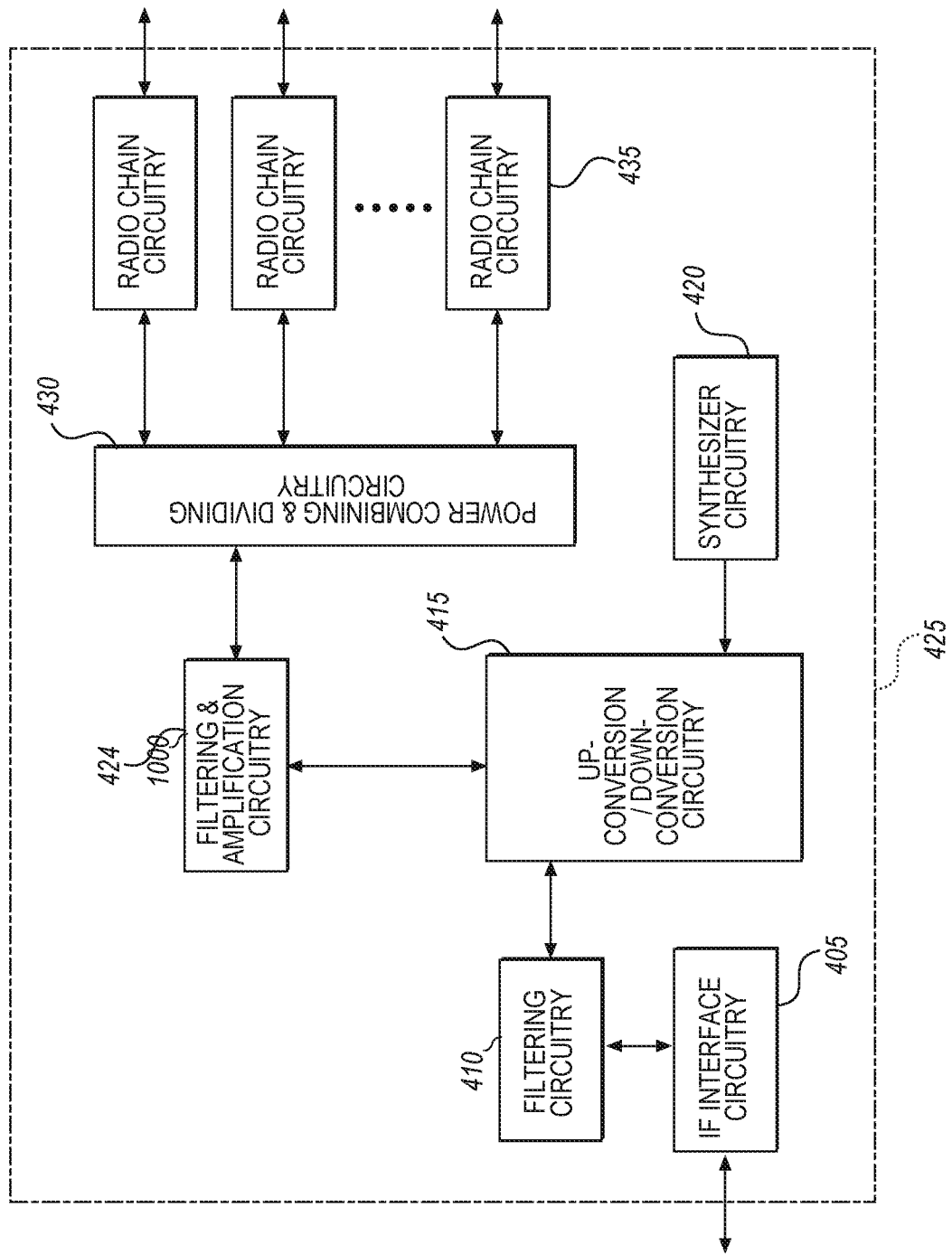
FIG. 4 illustrates exemplary useable RF circuitry in FIG. 3A according to some aspects.

FIG. 4 illustrates exemplary RF circuitry of FIG. 3A according to some aspects. In an aspect, RF circuitry 325 in FIG. 3A (depicted in FIG. 4 using reference number 425) may include one or more of the IF interface circuitry 405, filtering circuitry 410, up-conversion and down-conversion circuitry 415, synthesizer circuitry 420, filtering and amplification circuitry 424, power combining and dividing circuitry 430, and radio chain circuitry 435.

Figure 5B:
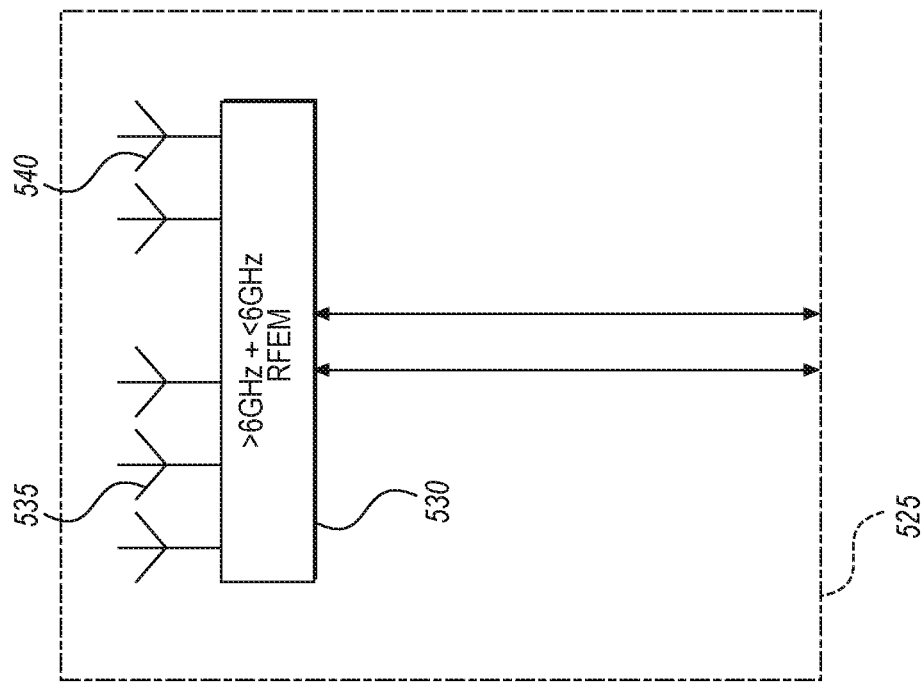
FIG. 5B illustrates an alternate aspect of an exemplary radio front end module, according to some aspects.
Figure 5A:
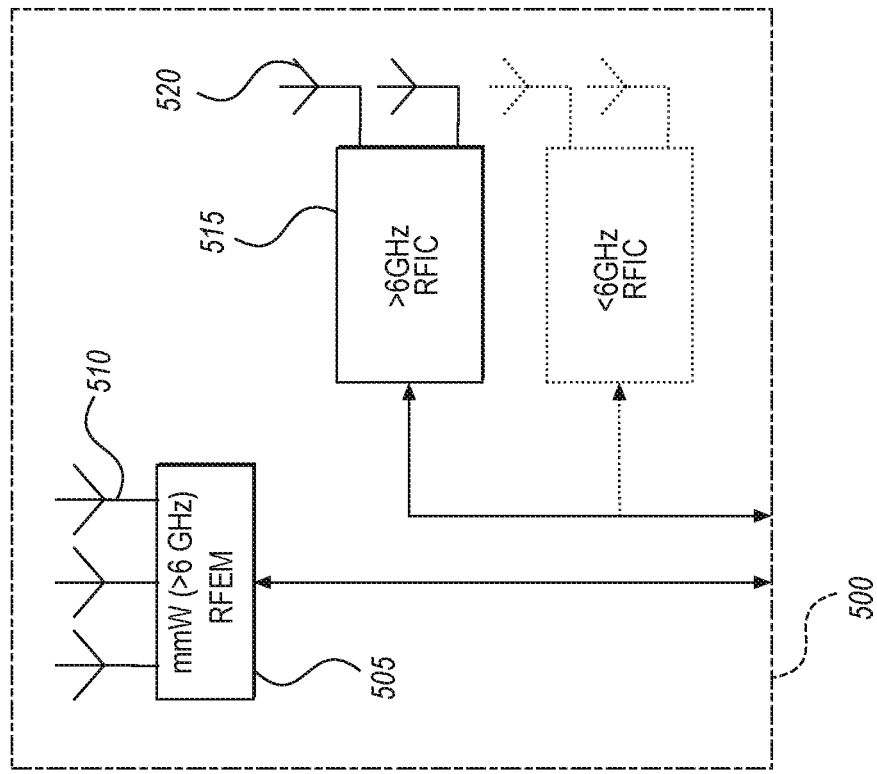
FIG. 5A illustrates an aspect of an exemplary radio front end module (RFEM) according to some aspects.

FIG. 5A and FIG. 5B illustrate aspects of a radio front end module useable in the circuitry shown in FIG. 1 and FIG. 2, according to some aspects. FIG. 5A illustrates an aspect of a radio front end module (RFEM) according to some aspects. RFEM 500 incorporates a millimeter wave RFEM 505 and one or more above-six gigahertz radio frequency integrated circuits (RFIC) 515 and/or one or more sub-six gigahertz RFICs 522. In this aspect, the one or more sub-six gigahertz RFICs 515 and/or one or more sub-six gigahertz RFICs 522 may be physically separated from millimeter wave RFEM 505. RFICs 515 and 522 may include connection to one or more antennas 520, RFEM 505 may include multiple antennas 510.

FIG. 5B illustrates an alternate aspect of a radio front end module, according to some aspects. In this aspect both millimeter wave and sub-six gigahertz radio functions may be implemented in the same physical radio front end module (RFEM) 530. RFEM 530 may incorporate both millimeter wave antennas 535 and sub-six gigahertz antennas 540.

Figure 6:
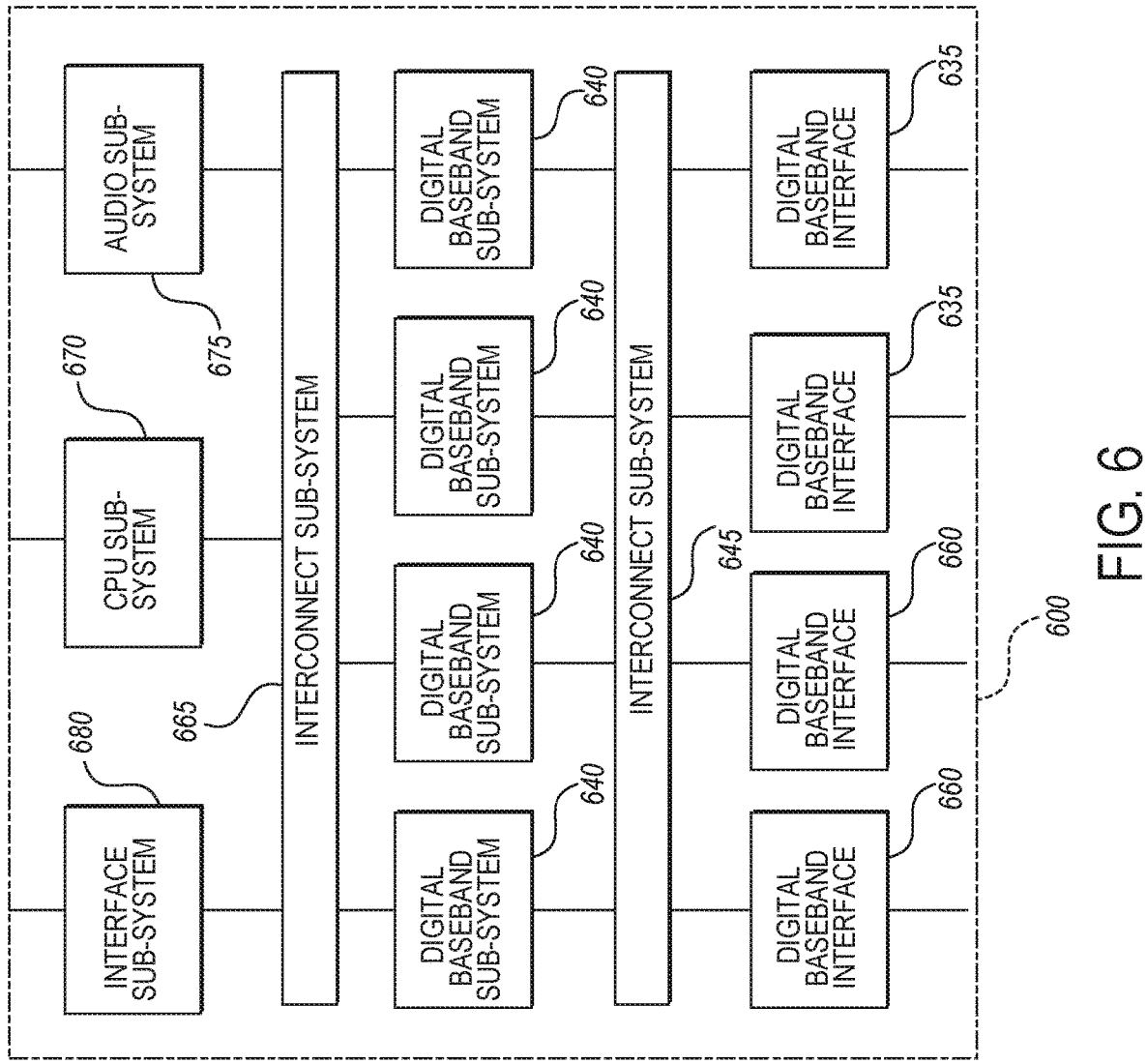
FIG. 6 illustrates an exemplary multi-protocol baseband processor useable in FIG. 1 or FIG. 2, according to some aspects.

FIG. 6 illustrates a multi-protocol baseband processor 600 useable in the system and circuitry shown in FIG. 1 or FIG. 2, according to some aspects. In an aspect, baseband processor may contain one or more digital baseband subsystems 640A, 640B, 640C, 640D, also herein referred to collectively as digital baseband subsystems 640.

In an aspect, the one or more digital baseband subsystems 640A, 640B, 640C, 640D may be coupled via interconnect subsystem 665 to one or more of CPU subsystem 670, audio subsystem 675 and interface subsystem 680. In an aspect, the one or more digital baseband subsystems 640 may be coupled via interconnect subsystem 645 to one or more of each of digital baseband interface 660A, 660B and mixed-signal baseband subsystem 635A, 635B.

In an aspect, interconnect subsystem 665 and 645 may each include one or more of each of buses point-to-point connections and network-on-chip (NOC) strictures. In an aspect, audio subsystem 675 may include one or more of digital signal processing circuitry, buffer memory, program memory, speech processing accelerator circuitry, data converter circuitry such as analog-to-digital and digital-to-analog converter circuitry, and analog circuitry including one or more of amplifiers and filters.

Figure 7:
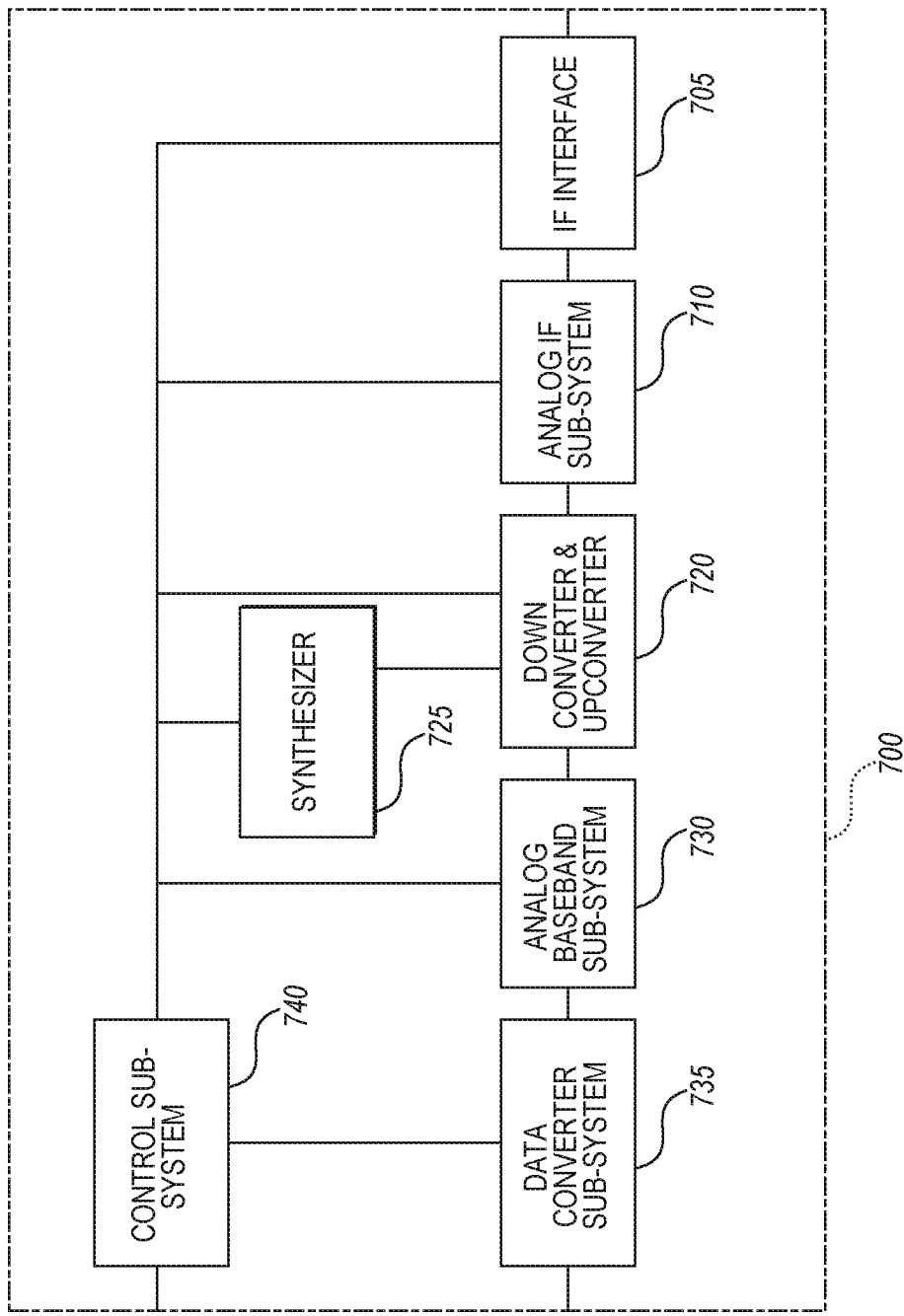
FIG. 7 illustrates an exemplary mixed signal baseband subsystem, according to some aspects.

FIG. 7 illustrates an exemplary of a mixed signal baseband subsystem 700, according to some aspects. In an aspect, mixed signal baseband subsystem 700 may include one or more of IF interface 705, analog IF subsystem 710, down-converter and up-converter subsystem 720, analog baseband subsystem 730, data converter subsystem 735, synthesizer 725 and control subsystem 740.

Figure 8A:
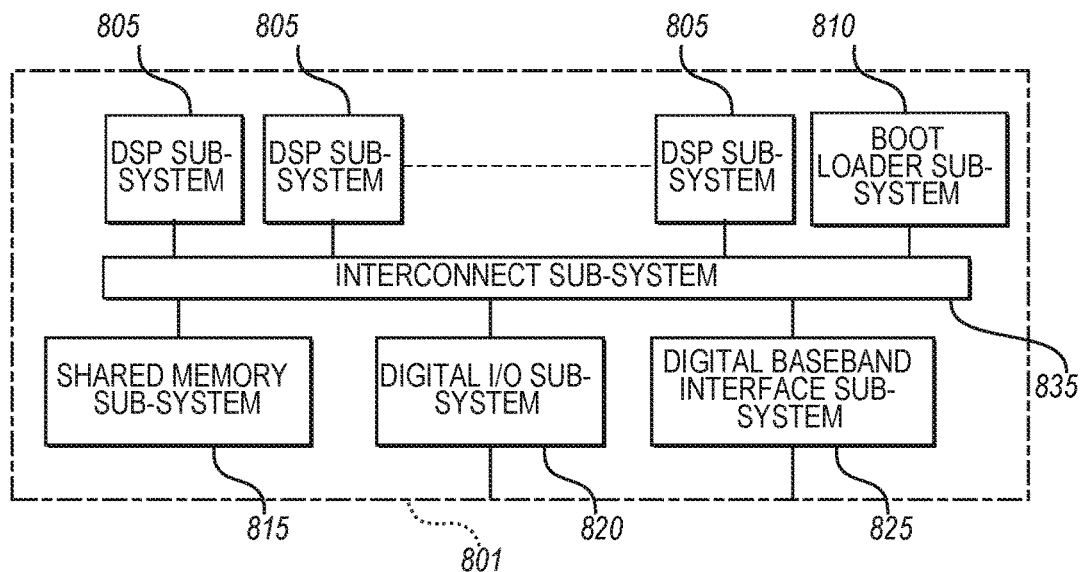
FIG. 8A illustrates an exemplary digital baseband subsystem, according to some aspects.
Figure 8B:
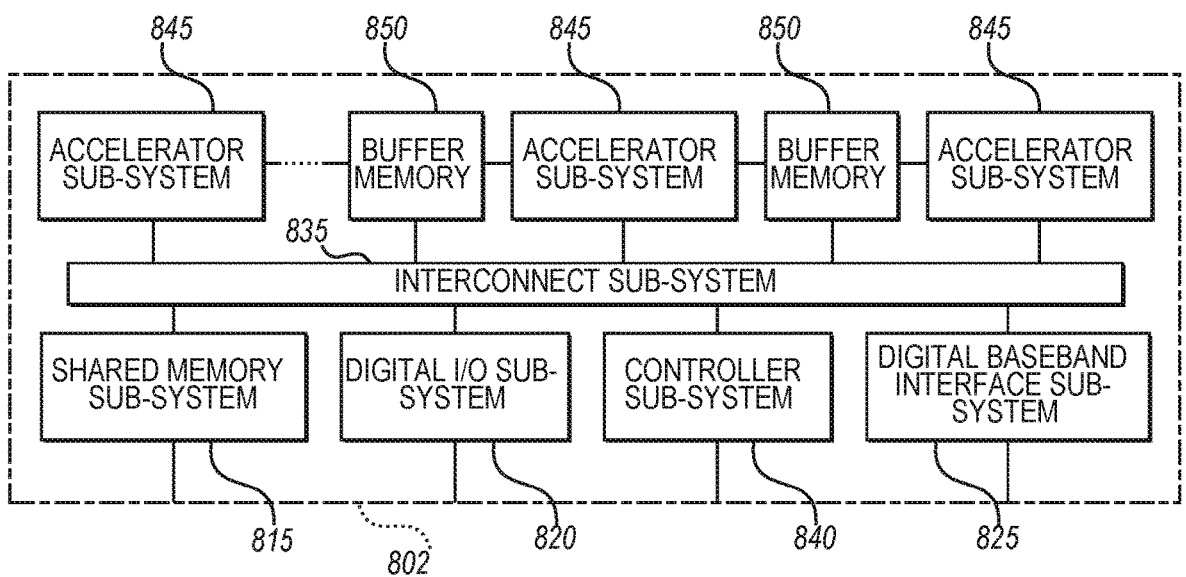
FIG. 8B illustrates an alternate aspect of an exemplary baseband processing subsystem, according to some aspects.

FIG. 8A illustrates a digital baseband processing subsystem 801, according to some aspects. FIG. 8B illustrates an alternate aspect of a digital baseband processing subsystem 802, according to some aspects.

In an aspect of FIG. 8A, the digital baseband processing subsystem 801 may include one or more of each of digital signal processor (DSP) subsystems 805A, 805B, . . . 805N, interconnect subsystem 835, boot loader subsystem 810, shared memory subsystem 815, digital I/O subsystem 820, and digital baseband interface subsystem 825.

In an aspect of FIG. 8B, digital baseband processing subsystem 802 may include one or more of each of accelerator subsystem 845A, 845B, . . . 845N, buffer memory 850A, 850B, . . . 850N, interconnect subsystem 835, shared memory subsystem 815, digital I/O subsystem 820, controller subsystem 840 and digital baseband interface subsystem 825.

In an aspect, boot loader subsystem 810 may include digital logic circuitry configured to perform configuration of the program memory and running state associated with each of the one or more DSP subsystems 805. Configuration of the program memory of each of the one or more DSP subsystems 805 may include loading executable program code from storage external to digital baseband processing subsystems 801 and 802. Configuration of the running state associated with each of the one or more DSP subsystems 805 may include one or more of the steps of: setting the state of at least one DSP core which may be incorporated into each of the one or more DSP subsystems 805 to a state in which it is not running and setting the state of at least one DSP core which may be incorporated into each of the one or more DSP subsystems 805 into a state in which it begins executing program code starting from a predefined memory location.

In an aspect, shared memory subsystem 815 may include one or more of read-only memory (ROM), static random access memory (SRAM), embedded dynamic random access memory (eDRAM) and/or non-volatile random access memory (NVRAM).

In an aspect, digital I/O subsystem 820 may include one or more of serial interfaces such as inter-integrated Circuit ($I^2C$), Serial Peripheral Interface (SPI) or other 1, 2 or 3-wire serial interfaces, parallel interfaces such as general-purpose input-output (GPIO), register access interfaces and direct memory access (DMA). In an aspect, a register access interface implemented in digital I/O subsystem 820 may permit a microprocessor core external to digital baseband processing subsystem 801 to read and/or write one or more of control and data registers and memory. In an aspect, DMA logic circuitry implemented in digital I/O subsystem 820 may permit transfer of contiguous blocks of data between memory locations including memory locations internal and external to digital baseband processing subsystem 801.

In an aspect, digital baseband interface subsystem 825 may provide for the transfer of digital baseband samples between baseband processing subsystem and mixed signal baseband or radio-frequency circuitry external to digital baseband processing subsystem 801. In an aspect, digital baseband samples transferred by digital baseband interface subsystem 825 may include in-phase and quadrature (I/Q) samples.

In an aspect, controller subsystem 840 may include one or more of each of control and status registers and control state machines. In an aspect, control and status registers may be accessed via a register interface and may provide for one or more of: starting and stop ping operation of control state machines, resetting control state machines to a default state, configuring optional processing features, and/or configuring the generation of interrupts and reporting the status of operations. In an aspect, each of the one or more control state machines may control the sequence of operation of each of the one or more accelerator subsystems 845. There may be examples of implementations of both FIG. 8A and FIG. 8B in the same baseband subsystem.

Figure 9:
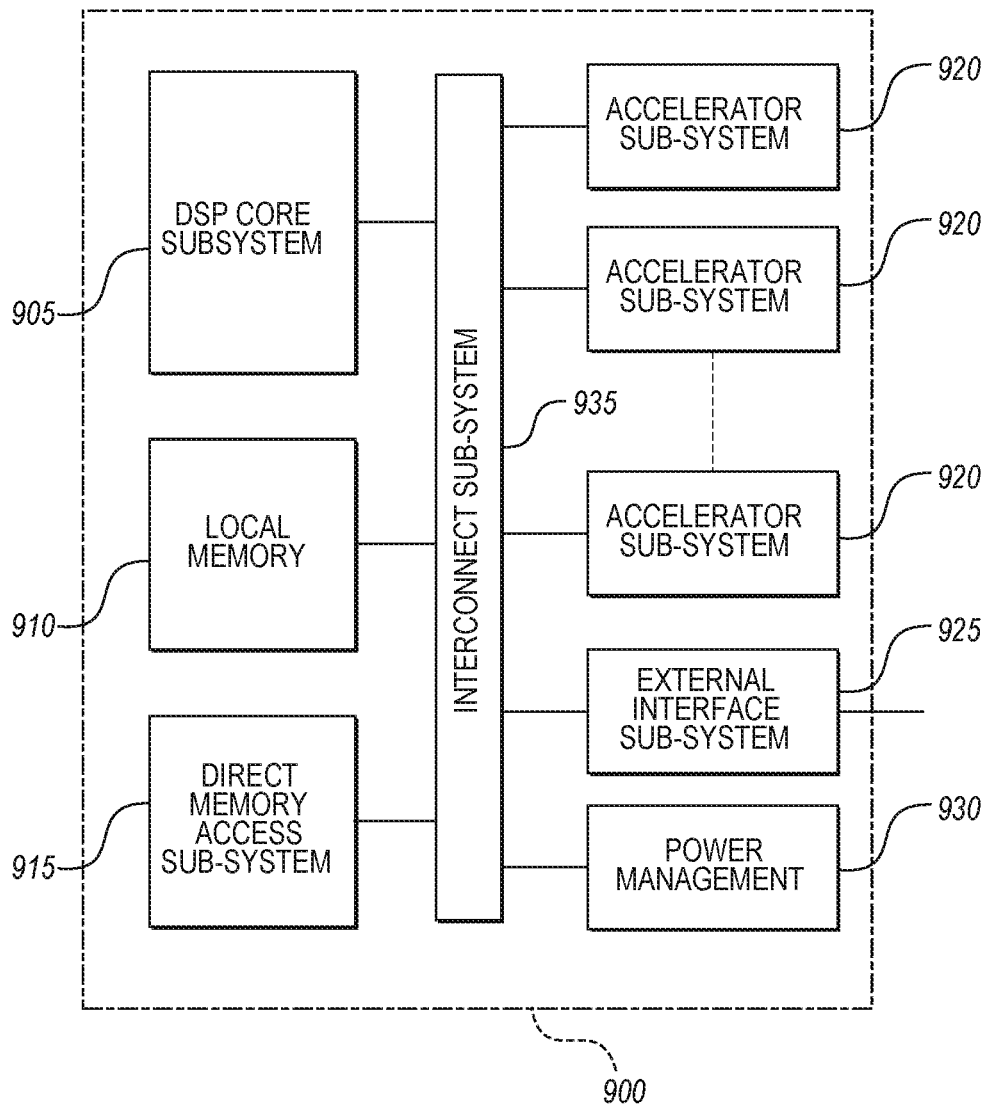
FIG. 9 illustrates an exemplary digital signal processor subsystem, according to some aspects.

FIG. 9 illustrates a digital signal processor (DSP) subsystem 900 according to some aspects.

In an aspect, DSP subsystem 900 may include one or more of each of DSP core subsystem 905, local memory 910, direct memory access (DMA) subsystem 915, accelerator subsystem 920A, 920B . . . 920N, external interface subsystem 925, power management circuitry 930 and interconnect subsystem 935.

In an aspect, local memory 910 may include one or more of each of read-only memory, static random access memory or embedded dynamic random access memory.

In an aspect, the DMA sub system 915 may provide registers and control state machine circuitry adapted to transfer blocks of data between memory locations including memory locations internal and external to DSP subsystem 900.

In an aspect, external interface subsystem 925 may provide for access by a microprocessor system external to DSP subsystem 900 to one or more of memory, control registers and status registers which may be implemented in DSP subsystem 900. In an aspect, external interface subsystem 925 may provide for transfer of data between local memory 910 and storage external to DSP sub system 900 under the control of one or more of the DMA subsystem 915 and the DSP core subsystem 905.

Figure 10A:
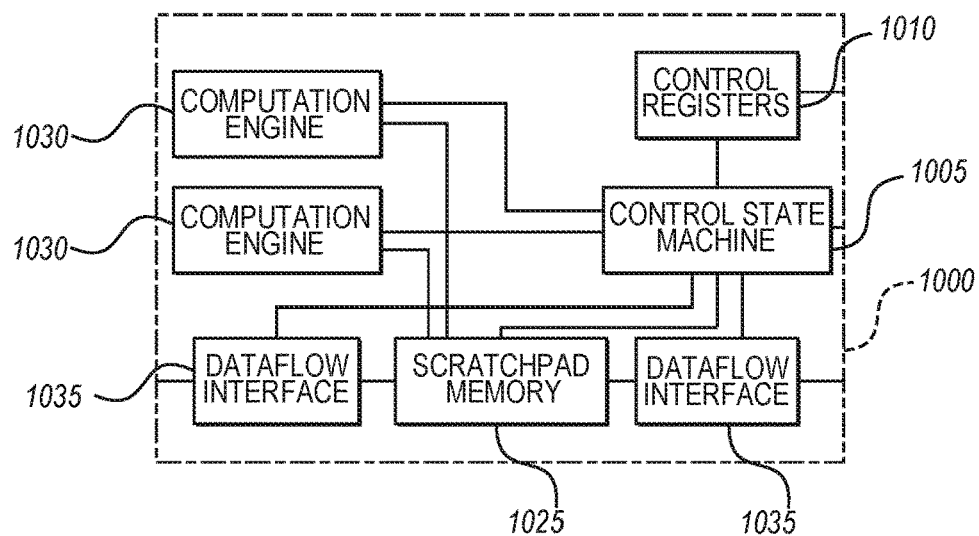
FIG. 10A illustrates an example of an accelerator subsystem, according to some aspects.
Figure 10B:
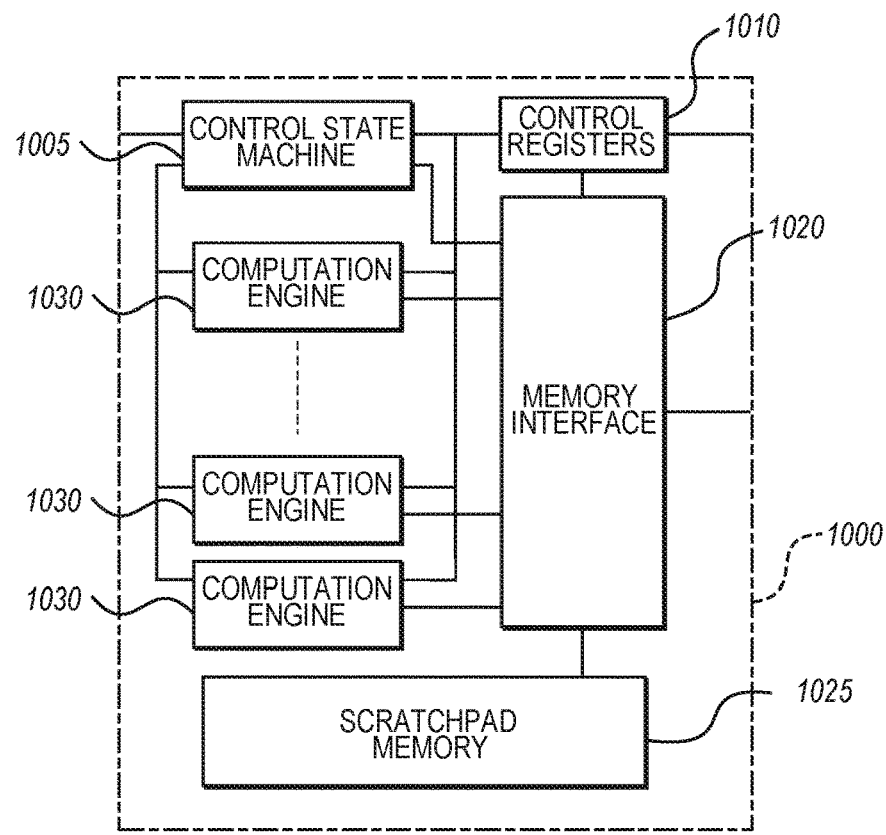
FIG. 10B illustrates an alternate exemplary accelerator subsystem, according to some aspects.

FIG. 10A illustrates an example of an accelerator subsystem 1000 according to some aspects. FIG. 10B illustrates an example of an accelerator subsystem 1000 according to some aspects.

In an aspect, accelerator subsystem 1000 may include one or more of each of control state machine 1005, control registers 1010, memory interface 1020, scratchpad memory 1025, computation engine 1030A . . . 1030N and dataflow interface 1035A, 1035B.

In an aspect, control registers 1010 may configure and control the operation of accelerator subsystem 1000, which may include one or more of: enabling or disabling operation by means of an enable register bit, halting an in-process operation by writing to a halt register bit, providing parameters to configure computation operations, providing memory address information to identify the location of one or more control and data structures, configuring the generation of interrupts, or other control functions.

In an aspect, control state machine 1005 may control the sequence of operation of accelerator subsystem 1000.

Adaptive Power Saving for Devices with Per-Panel Beam Sweeping

A mmWave communication system has been regarded as a promising technology for the next generation of cellular systems. To compensate for the large pathloss component of mmWave channels, these communication systems use a high beamforming gain. For the sake of the small wavelength of mmWaves, large antenna arrays can be implemented with a small antenna spacing and potentially lead to orders of magnitude increases in data rate for wireless communications. Additionally, a fully digital receiver architecture at a user device (e.g., the user device 100 (FIG. 1)) can help achieve low latency sector sweeping as well as high throughput performance in mmWave systems, compared to analog or hybrid beamforming.

One of the inevitable limitations of such large antenna arrays and fully-digital receivers, however, is significant hardware power consumption due to the large number of antenna outputs accompanying excessive analog-to-digital front-end bit-rate with the large signal bandwidth. For example, fully-digital receivers may make use of a larger number of data interfaces (e.g., IOs), which are a big source of power consumption. Per-panel beam sweeping and management (wherein a panel is connected to one RF chain and wherein each panel requires at least two IO links) can exploit multipath components to minimize or reduce loss of channel gains by using multi-finger beamforming at the base station (BS) (e.g., the base station of FIG. 2). However, per-panel beam sweeping may result in more Rx beams seen at a user device 100 compared to single-finger beamforming, which will in turn increase the number of IO links.

Figure 11:
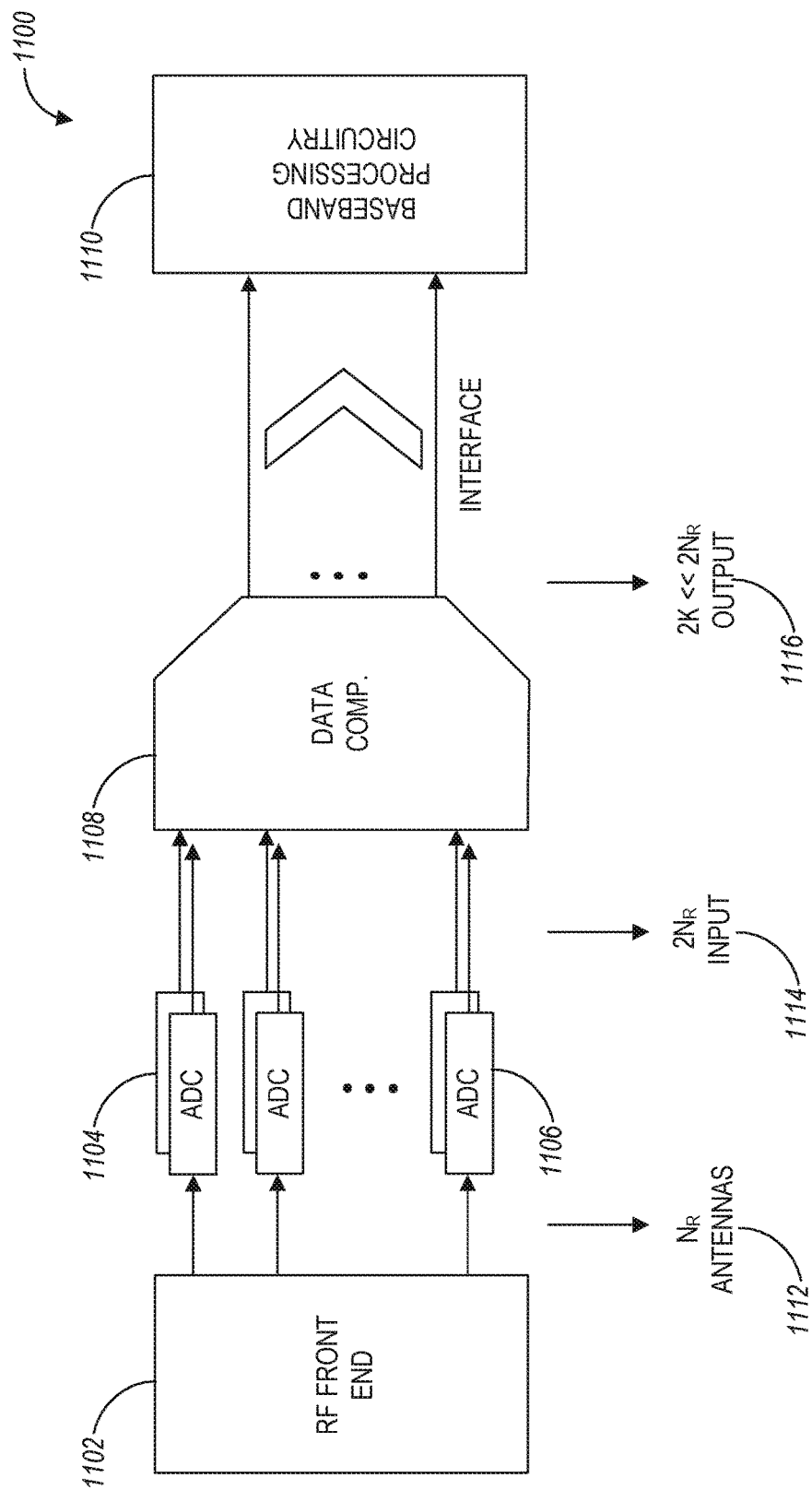
FIG. 11 illustrates an exemplary fully digital mmWave receiver architecture in accordance with some aspects.

FIG. 11 illustrates an exemplary fully digital mmWave receiver architecture 1100 in accordance with some aspects. Compression in aspects is conducted over the space domain, wherein $N_r$ antennas 1112 are fed through $2/N_r$. ADCs 1106 to provide $2N_r$ IO links 1114. Data compression is then performed by data compression module 1108 to provide outputs 1116 to the baseband processing circuitry 1110. Data compression algorithms attempt to compress space-domain ADC outputs, while minimizing performance degradation due to compression and while accounting for multi-cell environments. Compression can be performed in multiple stages. For example, a first stage can be performed based on a beamforming codebook and a second stage can depend on second-order characteristics of the effective channels, wherein effective channels are determined based on first-stage results. The first stage can help determine dominant Rx directions in a multi-cell environment, whereas the second stage can determine which Rx direction the fully-digital receiver should tune to.

The compression ratio performed in systems such as that depicted in FIG. 11 will depend on the number of Rx beams for the desired signal. Such compression may be inadequate and may still result in large amounts of power consumption. Apparatuses, systems and methods according to aspects can reduce the number of IO links by performing wideband digital precoding or Rx multi-panel (MP) co-phasing functionality in RF circuitry (e.g., RF circuitry 325 (FIG. 3A)) rather than in the baseband circuitry (e.g., digital baseband circuitry 310 (FIG. 3A)), wherein MP co-phasing refers to the process of coherently combining beams from two different panels. By performing MP co-phasing in the RF circuitry 325, the number of IO links used can be cut by at least a factor of two, resulting in reductions in power consumption. In aspects, power consumption can be reduced by deactivating a panel or portion of panels or RF chains using a control signal generated by the baseband circuitry 310. Deactivation can occur in multi-cell scenarios such as handover, multi-connectivity, and other scenarios.

Figure 12:
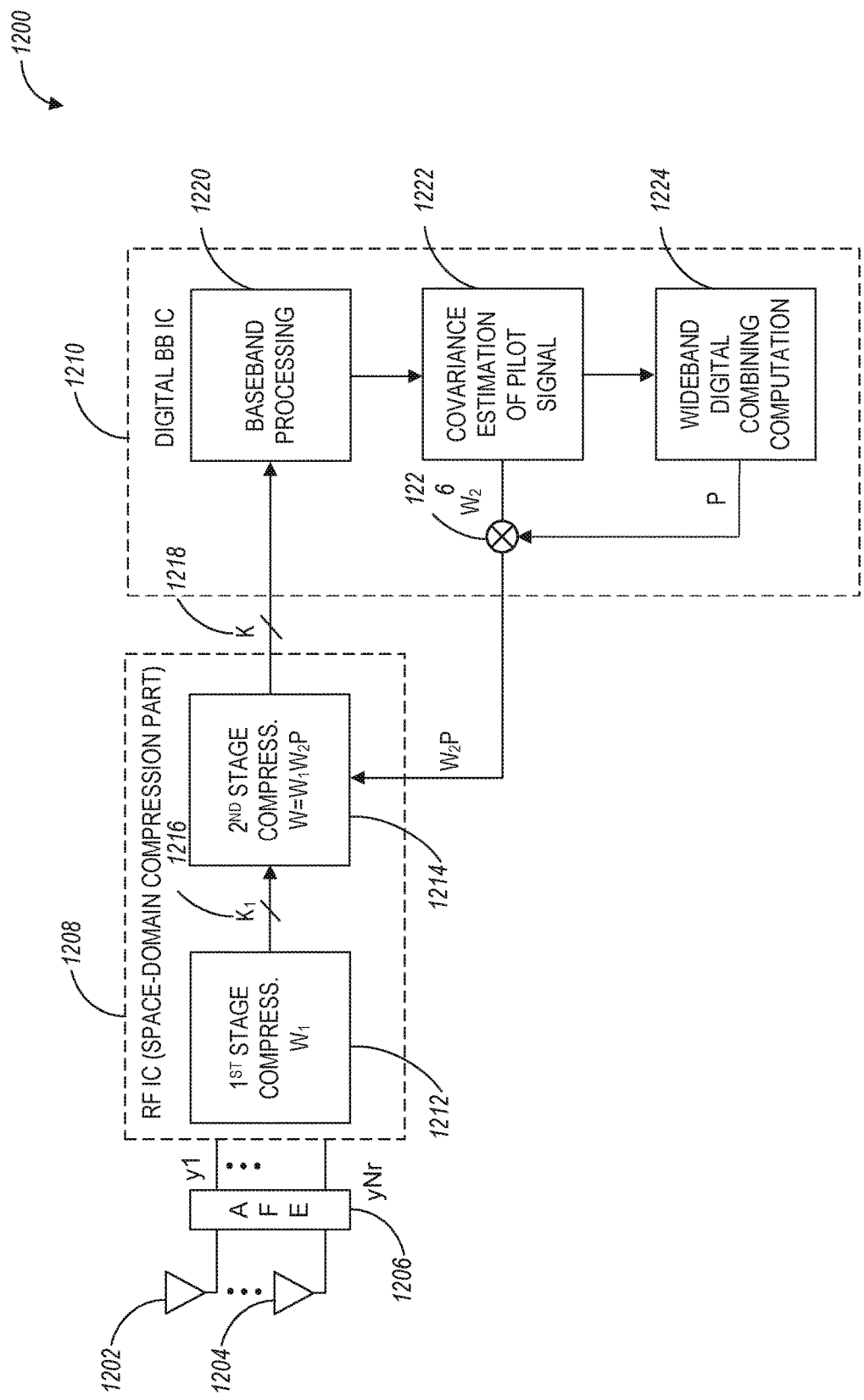
FIG. 12 illustrates an example block diagram of a system for implementing two-stage space domain compression in accordance with some aspects.

FIG. 12 illustrates an example block diagram of a system 1200 for implementing two-stage space domain compression in accordance with some aspects. Signals are received at antennas 1202, 1204 (or up to $N_r$ antennas, not shown in FIG. 12), which are input to the antenna front end (AFE) 1206 to generate received signals $y_1$ through $y_{N_r}$, and provided to radio frequency (RF) circuitry 1208 for further processing as described further below.

A two-stage compression method according to aspects can be expressed according to Equation (1):

$$W = W_1 W_2 P \in C^{N_r \times K} \quad (1)$$

where K is the number of active IO links, and wherein $K_1$ and $K_2$ denote the number of the maximum possible and intermediate IO links, respectively, satisfying $K_1 \geq K_2 \geq K$.

The first and second stage compression matrices are given by $W_1 \in C^{N_r \times K_1}$ and $W_2 \in C^{K_1 \times K_2}$ respectively and $P \in C^{K_2 \times K}$ is the wideband multi-panel matrix and is generated based on the co-phasing of the beams received at the multiple panels.

First-stage compression is performed at block 1212 within RF circuitry 1208 using the first stage compression matrix $W_1$ to generate IO links 1216, which also corresponds to $K_1$. Second-stage compression is performed at block 1214 according to equation (1) described above, to generate a reduced set of IO links 1218, which also corresponds to K. IO links 1218 are provided to the digital baseband circuitry 1210 for baseband processing at block 1220. After a received signal y(t) is compressed (e.g., Rx filtered) by $W_1$ $W_2$, baseband circuitry 1210 can process the compressed signal at block 1220. The Rx digital combining vector can be decomposed into a wideband part denoted by P at block 1224, plus the sub-band part at block 1222. Then, the wideband digital combining matrix $W_2$ P can be provided to the RE circuitry 1208 to further reduce the column dimension of W which in turn reduces the number of IO links because $K_2 > K$. In aspects, the baseband circuitry 1210 performs remaining digital processing on the compressed data signal $\tilde{y}_{data}(f)$ as given by Equation (2):

$$W^H \tilde{y}_{data}(f) = W^H H(f) b' d(f) + W^G z(f) \quad (2)$$

where d is the user data symbol, and H is the channel matrix, and z(f) is and b' is the multi-finger Tx beam vector.

Figure 13:
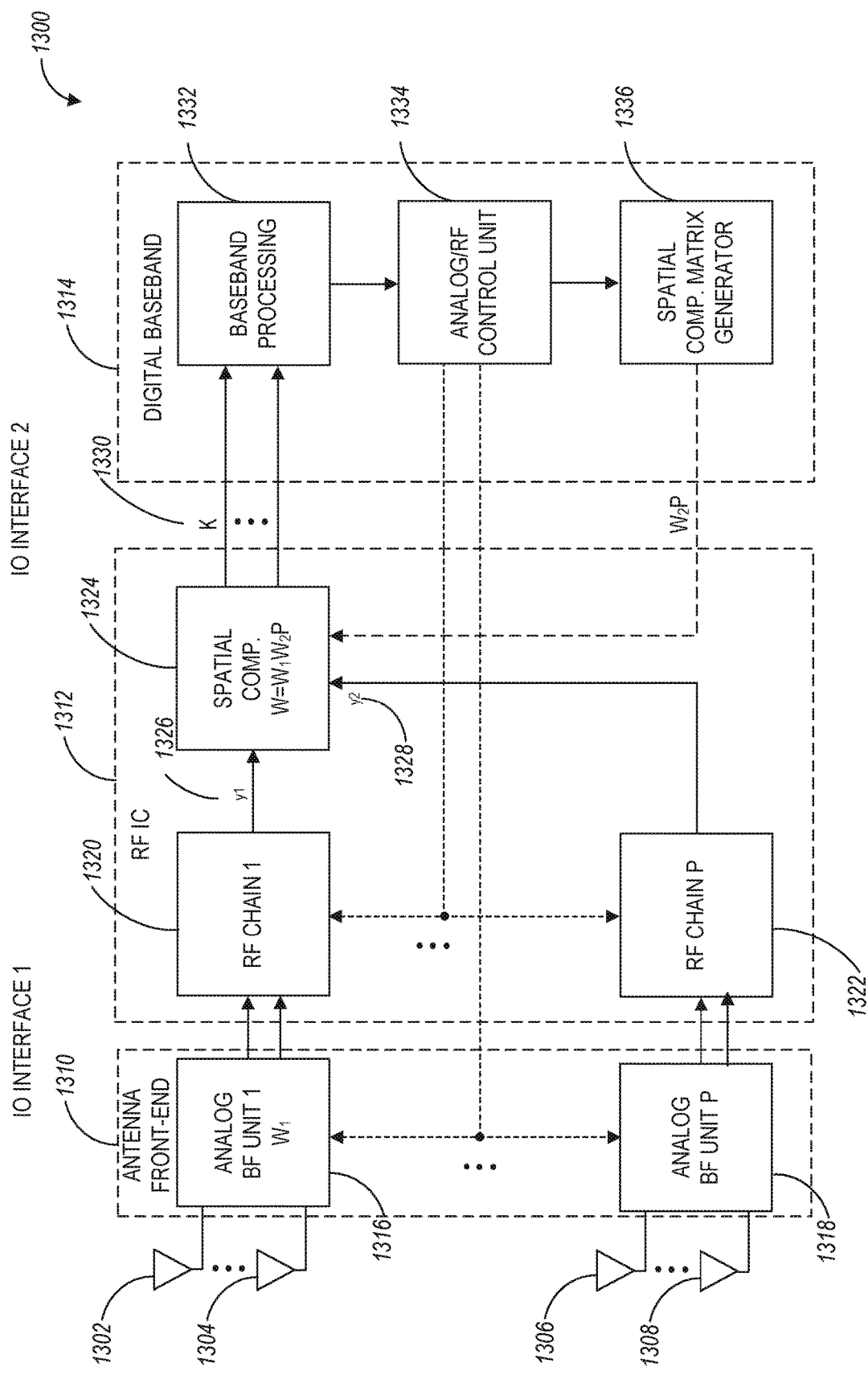
FIG. 13 illustrates an example block diagram of a system for implementing two-stage spatial compression for user devices having a multi-panel (MP) analog/hybrid architecture in accordance with some aspects.

FIG. 13 illustrates an example block diagram of a system 1300 for implementing two-stage spatial compression for user devices having a MP analog/hybrid architecture in accordance with some aspects. The system 1300 includes a MP AFE 1310, RF circuitry 1312 and baseband circuitry 1314. The AFE 1310 includes at least two panels (e.g., analog beamforming units) 1316 and 1318. Each panel 1316, 1318 receives inputs from multiple antennas 1302, 1304, 1306 and 1308 and provides at least two outputs for cross-polarization to RF chains 1320 and 1322. Each RF chain 1320 and 1322 provides an input to spatial compression block 1324, which performs operations that are similar in some aspects to the functions performed at block 1214 of FIG. 12 to generate a reduced set of IO links 1330, which also corresponds to K. IO links 1330 are provided to the digital baseband circuitry 1314 for baseband processing at block 1332.

Baseband circuitry 1314 further includes control circuitry 1334 (e.g., analog/RF control unit or control circuitry) that can turn on or off (e.g., activate or deactivate) RF chains 1320, 1322 and panels 1316, 1318 for additional power savings. Such control action by control circuitry 1334 can take place on a per-symbol basis, depending on the mode of the receiver of the user device 100. In aspects, the user device 100 can operate in at least two modes, a first mode that performs channel estimation and monitoring for multiple cells, and a second mode that performs only data demodulation only mode. Systems according to at least these aspects can monitor different Rx beams from different cells or transmission reception points (TRPs) in multi-cell environments such as in handover, multi-connectivity, and other applications.

In the first mode, the control circuitry 1334 can activate all available panels to monitor other cell's channel quality or interference, and the control circuitry 1334 can only a panel or subset of panels and RF chains for the serving cell. The user device 100 can switch modes as often as every Orthogonal Frequency-Division Multiplexing (OFDM) symbol according to the resource allocation of physical or higher-layer control signals and reference signals in multi-cell operations. In some aspects, if an OFDM symbol does not include a particular signal type (e.g., pilot signal or other reference signal) the user device 100 can switch to the second (data demodulation only) mode and turn off unnecessary panel and RF chains makes mode decisions and detects the panel that contains the desired signal (by decoding control channels and detecting pilot signals), the baseband circuitry 1314 will provide control and feedback (using, e.g., control unit 1334).

The baseband circuitry 1314 additionally includes a spatial co-phasing matrix generator at block 1336 to provide a MP co-phasing matrix to spatial compression block 1324. In aspects, therefore, system 1300 replaces the wideband digital combining matrix as used in system 1200 with the MP co-phasing matrix.

Priori Information and Complex Channel Measurements

The use of priori (e.g., side) information can help achieve a reduction in directional link setup time with low power consumption and low signaling overhead. In some aspects, a device can derive priori information from existing or prior directional communication links and use this information to narrow or prioritize a spatial searching region, allowing for the omission of additional resource-consuming information exchanges during a communication link setup procedure. Priori information can include, in some aspects, but is not limited to location coordinates (e.g., polar coordinates) of a spatial region (e.g., between two or more devices), location statistics, device characteristics (e.g., velocity, orientation, transmit power, or other capabilities), a prioritization order for searching the location coordinates of the spatial region, and calibration parameters.

In some aspects, a network node (e.g., central node) estimates or derives priori information from a prior or existing communication link with another network node. A network node can include a wireless communication device (e.g., user equipment), an access point (e.g., eNB, gNB), or another network device. In some aspects, a central node estimates or derives priori information at low cost from current or previously established communication links with multiple devices and can share the priori information with each of the multiple devices for the devices to use in establishing direct communication links between one another. When the priori information is valid, devices can achieve a reduction in directional link setup time, signaling overhead, and power consumption by narrowing or prioritizing a spatial searching region for directional beamforming operations, and in some instances, can even skip a spatial searching stage to find the right beam pair for establishing a directional communication link. When priori information includes information such as device characteristics (e.g., device profile, capabilities, velocity, orientation, transmit power) a device searching for another device in a wireless network can shorten an access and/or association procedure by omitting the transmission of certain information.

In many instances, complex channel measurements for beam tracking and/or calibration in higher frequency bands, such as the unlicensed 60 GHz band poses unique implementation challenges. To address this, new complex channel measurement mechanisms are described herein. In certain aspects, for two or more devices to use beamforming operations in establishing a wireless communication link (e.g., device-to-device (D2D) communication) between one another (e.g., to find an optimal beam within a spatial region for the link), the two devices can form an initial connection (e.g., using broad beam widths) and/or apply complex channel measurements to determine an optimal beam within the spatial region for establishing a communication link. In other aspects, complex channel measurements may also be used for calibration procedures, for example, calibration procedures related to determining optimal beams for forming wireless communication links between two or more devices, as described further below.

In some aspects, a device implements complex channel measurements, for example, in conjunction with a spatial searching operation and/or a beam tracking operation, to determine an optimal beam for establishing a wireless communication link with another device. In certain aspects, complex channel measurements include receiving signaling (e.g., decoding from received signaling), including a series of training fields transmitted by another device (e.g., network node, another wireless communication device), and determining an amplitude and phase of the received signaling according to each of a plurality of elements of a phased array antenna in the device.

A complex channel measurement procedure, in some aspects, includes one of two devices adding training fields to an end of a frame to enable the channel measurement between the two devices. In some aspects, this procedure occurs after an initial connection is established between the two devices (e.g., broad beam communication link, pseudo-omni beam communication link) and results in a measurement of a phase and an amplitude of an antenna within one or both of the devices (e.g., signaling received per antenna element within an antenna array). In some aspects, complex channel measurement procedures may also be implemented for beam refinement and calibration operations, which can result in accurate measurements of a phase and an amplitude of an incoming signal per an antenna element within a device (e.g., wireless communication device) under calibration. Additionally, complex channel measurement procedures can likewise be used to determine phase shifter values in compensating for phase offsets in an antenna (e.g., modular antenna array system) when a remote unit (e.g., remote wireless communication device) is positioned at a known angle.

Figure 14:
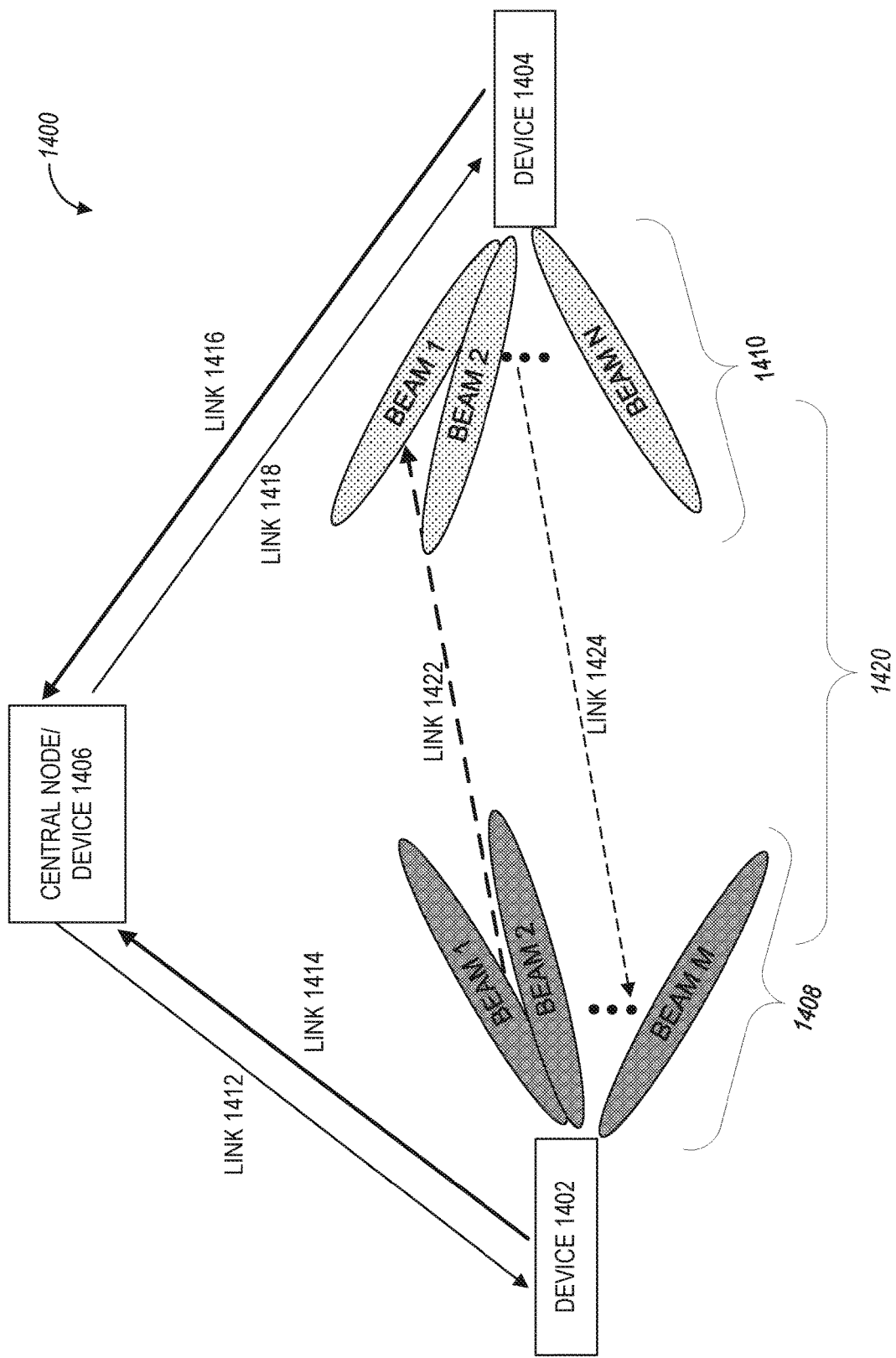
FIG. 14 illustrates an exemplary directional communication network, in accordance with some aspects

FIG. 14 illustrates an exemplary wireless communication network 1400, in accordance with certain aspects. In some aspects, the wireless communication network 1400 includes devices 1402, 1404, 1406, which may include any of the various wireless devices (e.g., UEs, network nodes) described herein. At a certain point in time, $t_1$, device 1402 and device 1404 are not yet in communication with one another and may know nothing yet about how to establish communications with one another (e.g., device-to-device (D2D) communication). To establish a communication link between one another, for example, a directional communication link involving a beamforming operation, device 1402 and device 1404 can perform several operations. In some aspects, these operations include any one or more of calculating antenna weight vectors to form beam pairs, scanning a spatial region between one another, or selecting certain beams from a set of beams, such as searching a beamforming codebook with a (e.g., high-resolution) beam.

In some aspects, at time $t_2$, using priori information (e.g., decoded from signaling received from a central node or device 1406), device 1402 or device 1404 can modify (e.g., reduce, narrow) or prioritize a spatial region (e.g., 1420). The device can use the priori information for selecting a beam, region, or direction of the spatial region 1420 and/or for searching a beamforming codebook to determine a subset of the codebook (e.g., subset of beams) from a superset of the beamforming codebook (e.g., superset of beams) to form a beam. Additionally, using such priori information, device 1402 or device 1404 can scan the spatial searching region in a specified order based on information included within the priori information, such as location coordinates of the spatial region (e.g., spatial region between the devices), location statistics, device characteristics (e.g., device profile, velocity, orientation, transmit power, other capabilities), prioritization information for searching the spatial region or prioritization of location coordinates within the spatial region, and calibration parameters, as described below. In some aspects, device 1402 or device 1404 can also calculate antenna weight vectors to form beam pairs directly pointing to one another using accurate location information, or other information, included in the priori information.

In certain aspects, a single node (e.g., central node 1406) or multiple nodes can encode priori information within signaling to any of device 1402, device 1404, both devices 1402 and 1404, or additional network devices. The priori information may be derived from existing or previous communication links between a central node (e.g., 1406) and one or more devices (e.g., device 1402, device 1404, both devices 1402 and 1404, or one or more other network nodes/devices). Various types of communication links and communication protocols described herein can be used for deriving priori information, for example, cellular, IEEE 802.11 (e.g., Wi-Fi), Bluetooth, GPS, ultrasound, although aspects are not so limited. In some aspects, priori information is derived from environmental characteristics and feedback from devices (e.g., device 1402, device 1404) indicating signal interference and/or multipath fading. For example, a device and/or node (e.g., central node 1406) can derive priori information from reference signals (e.g., demodulation reference signal, sounding reference signal, cell-specific reference signal, etc.), in a cellular network, or short training signals, in a Wi-Fi network. In some aspects, a device can be configured to derive priori information from a current active and optimal directional beam, from a submission (e.g., by another device) of measured information (e.g., a measured location from GPS data, multilateration, or triangulation), and/or from an association with a small cell.

Aspects are not limited to deriving priori information from communication links between network nodes, for example, a network node (e.g., device 1402, device 1404, device 1406) can be preconfigured with priori information (e.g., stored in device memory) or may sense network and/or environmental characteristics and include sensed information in priori information for transmission (e.g., encode in signaling) to another node or device. In other aspects, the communication link between network nodes may become obstructed or a node may lose a connection with a cell. In such aspects, at a later point in time a network node can use information previously known to the node whose connection was lost as priori information, such as spatial coordinates (e.g., polar coordinates), location coordinates (e.g., altitude, elevation), and signal power level. In such aspects, the priori information may assist a network node in predicting and/or determining a specific region (e.g., subset of a spatial region, subset of beams, subset of sectors in a multi-sector system) to search for a beamforming operation and in establishing a directional communication link. Priori information may be derived in real-time, however aspects are not so limited, as a network node can also derive priori information based on past or formerly obtained information. In certain aspects, a network node may use artificial intelligence (AI) (e.g., machine learning) to derive priori information and/or predict a spatial location of a device based on previously-known information.

Referring to FIG. 14, the central node (e.g., device 1406) has established a previous or current communication link between device 1406 and device 1402, and a previous or current communication link between device 1406 and device 1404. The communication link between device 1406 and device 1402 includes link 1412 and link 1414, and the communication link between device 1406 and device 1404 includes link 1416 and link 1418. Links 1412, 1414, 1416, and 1418 are wireless communication links, and as described above, can be implemented using any of the communication protocols described herein. In an example, devices 1402, 1404, and 1406 each include one or more antennas for establishing such wireless communication links, for example, any of an omni-directional antenna, directional antenna, antenna array (e.g., phased array antenna), switched-beam antenna, or a beam-steering antenna. However, aspects are not so limited as devices 1402, 1404, and 1406 may include various other types of antennas as described herein. In certain aspects, device 1406 has established the wireless communication links 1412, 1414, 1416, and 1418 (e.g., current or prior links) connecting to device 1402 via link 1412 and link 1414, and connecting to device 1404 via link 1416 and link 1418. Links 1412, 1414, 1416, and 1418, in some aspects, are directional links with high resolution beams, however, aspects are not so limited as any of links 1412, 1414, 1418, 1422, and 1424 can include any of a directional link, omni-directional link, pseudo-omni directional, or quasi-omni directional link.

To assist in forming a directional communication link between device 1402 and device 1404 (e.g., D2D communication link), in some aspects, device 1406 obtains priori information from the current or previously established directional links 1412, 1414, 1416, and 1418 and then shares this priority information to one or both of devices 1402 and 1404 via signaling to one or both device 1402 and 1404 (e.g., links 1412, 1414, 1416, and 1418). Device 1406 can encode the priori information for transmission to device 1402 and/or 1404 within signaling including but not limited to any of control signaling or management signaling (e.g., RRC signaling SIB, management frames, etc.). In other aspects, device 1406 can encode the priori information for transmission to device 1402 and/or 1404 over a data plane. For example, device 1406 may encode and transmit the priori information to device 1402 and/or 1404 via packet signaling (e.g., IP packet transmitted via a wired or wireless wide-area-network connection).

The priori information includes any of location coordinates of a spatial searching region (e.g., spatial region 1420), location statistics, device characteristics (e.g., device profile, velocity, orientation, transmit power, other capabilities), or prioritization information for searching the spatial region, location coordinates within the spatial region, or calibration parameters. Aspects are not so limited, however, and priority information may include any other information that might impact the formation of a (e.g., directional) communication link between two devices. In some aspects, the device 1406 uses metrics to evaluate the priori information or statistics based on certain criteria prior to transmitting to devices 1402 and 1404 (e.g., through directional links 1412, 1414, 1416, and 1418). If device 1406 determines that the priori information is not valid, device 1406 can then return to a regular directional link setup procedure using standard procedures.

Once devices 1402 and 1404 receive and/or decode the priority information (e.g., through directional links 1412, 1414, 1416, and 1418), they can perform a spatial searching operation and/or modify (e.g., reduce, narrow, or prioritize) a spatial region 1420 to search between one another, and proceed to initiating directional link establishment between one another (e.g., 1422 and 1424). The devices can achieve this by using any one of the methods described above, including but not limited to, prioritizing a spatial searching region for selecting and/or searching a subset of a beamforming codebook (e.g., subset of beams) from a superset of the beamforming codebook (e.g., superset of beams), scanning the spatial region 1420 in a specified order based on information included within the priori information, such as location coordinates of the spatial region 1420, location statistics, device characteristics (e.g., device profile, velocity, orientation, transmit power, other capabilities), and prioritization information for searching the spatial region or location coordinates within the spatial region, and calculating antenna weight vectors to form beam pairs directly pointing to one another using accurate location information, or other information, included in the priori information.

In some aspects, with priority information such as transmit power or device capability, for example, the devices can further reduce access and/or association time and signaling overhead by skipping or omitting the exchange of certain information altogether. In certain aspects, if a link budget allows, the devices can establish an initial connection and generate a pseudo-omni beam on both an initiating device and in responding device, for example, where a pseudo-omni pattern may be optimized for an intended steering range. This approach can provide minimal overhead for an initial stage.

In such aspects, the devices can reduce directional link setup time, signal overhead, and power consumption with low cost by exploring the priority information from prior or currently existing directional links. For example, compared to a multi-stage beamforming method, the devices can reduce the spatial searching time by skipping quasi-omni/sector level beam searching and only search a subset of beams within a sector level region (e.g., within 1420). If the location information obtained from the existing directional link is accurate, the devices can reduce the searching time to zero by directly finding a beam pair or calculating the antenna weighting vectors to form a beam pointing to one another. In aspects where no valid priori information is available from existing communication links, the devices can simply default to using a regular directional link setup procedure.

Aspects described herein can be applied to any wireless communication network including but not limited to mmWave networks, WLAN/WPAN/Mesh networks, cellular (e.g., LTE, LTE-Advanced, 5G system) networks, device-to-device networks, or sensor networks. For example, in a line-of-sight (LOS) cellular system with device-to-device communication, an eNB/gNB can estimate a device (e.g., UE) location using timing advance and high-resolution beam pointing to the UE to determine the UE proximity for UEs in connected mode. In some aspects, a screened neighbor list can be encoded and transmitted to a discovering UE to shorten a direct discovery procedure by searching an effective space (e.g., spatial region) and skipping and/or omitting certain information without talking to core network or external system.

Figure 15:
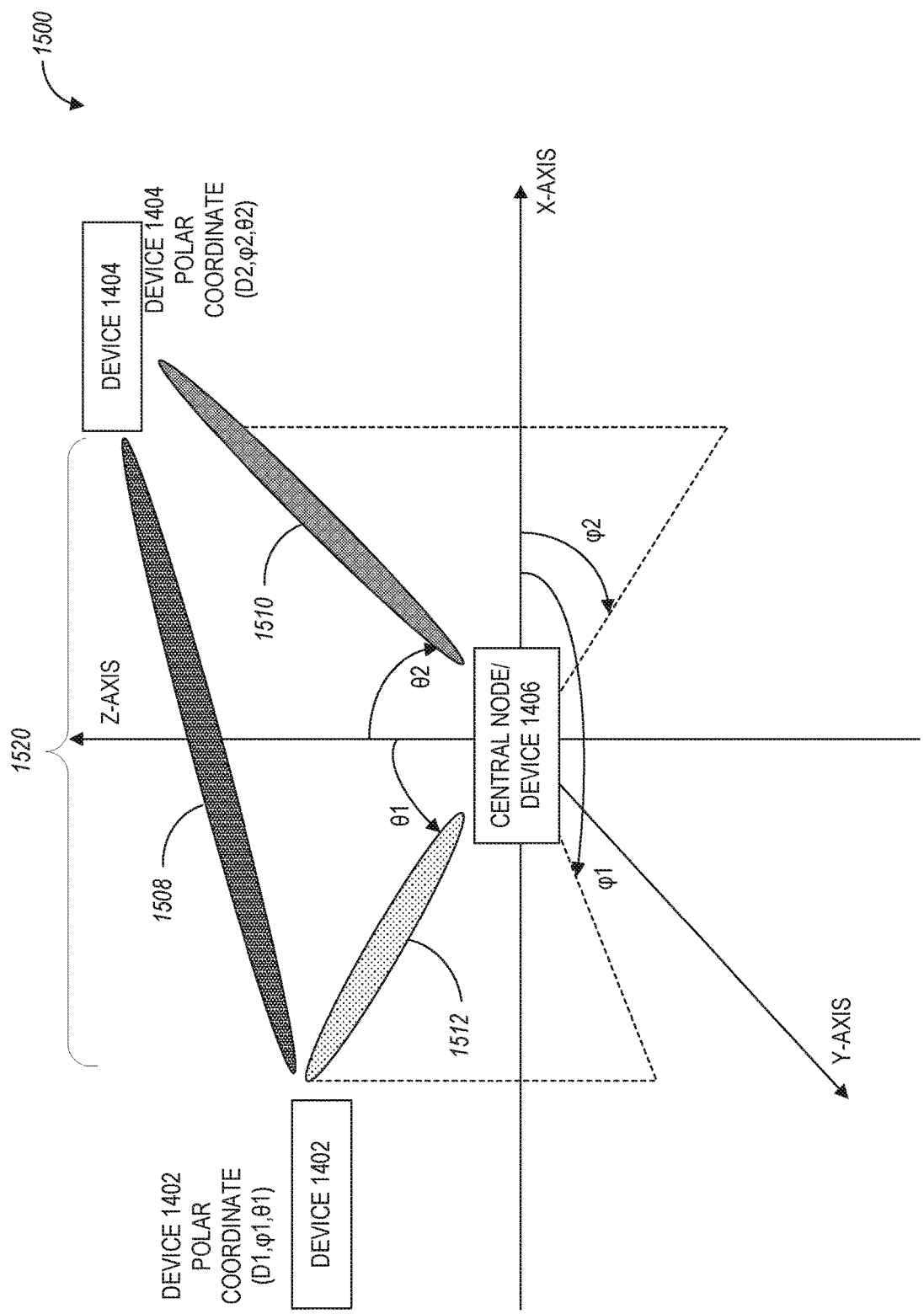
FIG. 15 illustrates an exemplary directional communication network, in accordance with some aspects.

FIG. 15 illustrates an exemplary directional communication network 1500, in accordance with certain aspects. The directional communication network 1500 includes, in some aspects, devices 1402, 1404, and 1406.

Devices 1402 and 1404 wirelessly communicate with the central node (e.g., device 1406) using a (e.g., high resolution) beam pair, and using this communication link, device 1406 can estimate the location of devices 1402 and 1404 (e.g., in polar coordinates (D, θ, φ) with device 1406 as a reference origin. The distance between device 1406 and device 1402, 1512, and the distance between device 1406 and 1404, 1510, can be calculated by D=TA/2×c, where c is the speed of light 3.0×108 m/sec and TA is the timing advance or round trip delay measured, for example, using a preamble and/or reference signal in cellular system or a short training signal in a Wi-Fi network transmitted over a directional link (e.g., prior or current) from each of the respective devices 1402 and 1404 to a central node (e.g., the device 1406). TA is obtained without extra cost since it is obtained to measure and compensate for the existing link and (θ, φ) is the high-resolution beam direction from device 1406 to either one of devices 1402 and 1404, which may be known at the device 1406 from the existing or previous directional links. In such aspects, the device 1406 can easily obtain UE location information with no additional cost of resources. With the location coordinates of devices 1402 and 1404, the device 1406 calculates the polar coordinate of one device with the other device as the reference origin. For example, device 1406 calculates the coordinates of device 1404 (e.g., polar coordinates ΔD, Δθ, Δφ) with device 1402 as the reference origin and calculates the polar coordinates of device 1402 (ΔD, −Δθ, −Δφ) with device 1404 as the reference origin according to the following equations.

$$\Delta D = \sqrt{(D_2\sin\theta_2\cos\varphi_2 - D_1\sin\theta_1\cos\varphi_1)^2 + (D_2\sin\theta_2\sin\varphi_2 - D_1\sin\theta_1\sin\varphi_1)^2 + D_2\cos\theta_2 - D_1\cos\theta_1^2}$$

$$\Delta\theta = \arccos\left(\frac{D_2\cos\theta_2 - D_1\cos\theta_1}{\Delta D}\right)$$

$$\Delta\varnothing = \arctan\left(\frac{D_2\sin\theta_2\sin\varphi_2 - D_1\sin\theta_1\sin\varphi_1}{D_2\sin\theta_2\cos\varphi_2 - D_1\sin\theta_1\cos\varphi_1}\right)$$

where ($D_1$, $\theta_1$, $\varphi_1$) and ($D_2$, $\theta_2$, $\varphi_2$) are the polar coordinates of devices 1402 and 1404, respectively, with device 1406 as the reference origin, respectively. In this way, device 1406 can determine a distance between devices 1402 and 1404 (e.g., 1508), and may further characterize the spatial region (e.g., 1420, 1520) between the two devices. The accuracy of a device (e.g., UE) location using this method can be improved by using a wideband preamble or short training signals with smaller timing resolution to increase the distance estimation accuracy and a very narrow beam from device 1406 to either of devices 1402 and 1404. Given the typical sizes of antenna arrays and bandwidth in mmWave and cmWave communications, accuracy is expected to be high in LOS communication links. If device location accuracy is concerned, a central node (e.g., device 1406) can derive and include device location statistics as part of the information encoded as the priori information and/or side information.

In some aspects, the device 1406 (e.g., another device, or circuitry within device 1406) post processes and evaluates the validity of priori information and determines whether the priority information is valid based on specified threshold values, metrics, and/or settings. If the priori information does not pass the specified criteria, the device 1406 can refrain from transmitting priori information to the devices 1402 and 1404, and proceed with a regular directional link setup procedure. Devices 1402 and 1404 then use the priori information to perform faster directional link setup between one another. With the location priori information, the device can narrow or prioritize the spatial region, 1420, by performing any one of the spatial searching operations and/or modifications to a spatial region described above (e.g., with respect to FIG. 14).

Referring to FIG. 14 and FIG. 15, any one of devices 1402, 1404, 1406 (e.g., processing circuitry, transceivers, and antennas of devices 1402, 1404, 1406) may be configured to perform complex channel measurements. For example, device 1402 and device 1404, in some aspects, are configured to perform complex channel measurements within a spatial region (e.g., 1420, 1520). The devices may use complex channel measurements in, for example but not limited to, any of the beamforming (e.g., beam selection) operations and/or in calibration procedures described herein. In some aspects, at least one of device 1402 and device 1404 receives signaling (e.g., decodes signaling) from another device (e.g., 1402, 1404, 1406) that includes a series of training fields transmitted by the other device, and determines (e.g., using processing circuitry) an amplitude and phase of the signaling received by the antenna in the receiving device (e.g., received by an element of an antenna array in the receiving device). In certain aspects, as part of a complex channel measurement procedure, the transmitting device adds training fields to an end of a frame to enable the channel measurement between the two devices, resulting in a phase and an amplitude measurement (e.g., of at least one of the antennas of the devices).

In some aspects, the receiving device uses resulting complex channel measurements (e.g., for beam refinement and/or calibration operations), to obtain accurate measurements of phases and amplitudes of incoming signals (e.g., per an antenna element under calibration) and can then use these results in establishing an optimal communication link between one another, the receiving and the transmitting device (e.g., 1402, 1404, 1406). In certain aspects, as part of a complex channel measurement procedure, the receiving device receives one or more training fields via the device transceiver and antenna (e.g., receives the training fields on all elements in a phased array) while deriving a phase shifter value (e.g., per element) from an invertible matrix (e.g., invertible matrix, Hadamard matrix). The receiving device can then determine phases of incoming training fields (e.g., at each element). This process can assist in maintaining maximal link budget for the complex channel measurement procedure. In some aspects, the device selects an optimal invertible matrix based on factors such as an ability to generate the necessary phase offset relationships and an ability to efficiently perform mathematical operations. Once the device completes the measurements, the results can be inverted to extract a phase and an amplitude per array element.

A single training field can refer to a phase shifter offset relationship corresponding to a specific entry in the invertible matrix, and a specific training field can be repeated multiple times during a complex channel measurement procedure. In some aspects, a transmitting device (e.g., 1402, 1404) can improve the accuracy of a complex channel measurement procedure by using a repetition of a single training field (e.g., transmitting repetitions of the single training field) and the receiving device can average the phase and amplitude measurements evaluated, which the receiving device may use to compensate for error introduced through factors such as phase noise. In certain aspects, a matrix (e.g., invertible matrix, Hadamard matrix) from the complex channel measurement can be useful for system verification. This can ensure that the expected array gains are achieved for various configurations and isolate failures in the system that would result in degraded performance.

In some aspects, an accurate residual frequency offset compensation is desirable in a device executing a complex channel measurement procedure. Devices, for example, can achieve initial time synchronization between one another (e.g., between a transmitting device and receiving device 1402, device 1404) through means including but not limited to the decode of the frame header. To compensate for the frequency offset between the endpoints, the receiving device can digitally compensate for the frequency offset. In some aspects, a device achieves this through digital processing of the measurements through the repetition of training fields to identify the frequency offset between the endpoints (e.g., between devices). For example, a device may transmit 16 training fields in order followed by repeating these 16 training fields 3 additional times. These results may then be post-processed to determine the most likely frequency offset for generation of each training field at a remote endpoint (e.g., remote device) by assessing a time drift over a series of repeated training field sequences, and adjusting the measured time offset (e.g., and phase) based on this calculated frequency error between the endpoints.

In certain aspects, control signaling between baseband circuitry (e.g., 310) and an RFIC (e.g., 325) may be insufficient to precisely shift phase shifters in a device at a desired speed. Therefore, the RFIC may include support to trigger sequences of phase shifter value changes independent of end-to-end control via the baseband circuitry. For example, the baseband circuitry (e.g., baseband modem) can preload a sequence of phase shifter values and a schedule of changes between these states and then trigger the initiation of the complex channel measurement procedure.

Gain flatness of a (e.g., remote) device (e.g., device 1402, device 1404) can impact the range of beams that can be evaluated for optimality. For example, if a deep null is experienced by the device relative to the optimal beam, this beam will be scored lower than if this null were not present at this location. Therefore, in some aspects, the device in a complex channel measurement may choose to increase a beam width by means including but not limited to using a subset of active elements (e.g., of an antenna array) or setting phase shifter values to widen the beam width of the beam and minimize the ripple in in within the main lobe. In some aspects, the device may repeat a complex channel measurement procedure with multiple different selected beams. This can better enable multiple beams following different paths to be evaluated as locally optimal beams to find a global optimal beam. For, example, during complex channel measurement, one device can use a fixed beam and another device can iterate and/or switch through training fields (e.g., training beams), which may have a mathematical interrelationship, for example, as derived from a Hadamard matrix. In some cases, determining multiple unrelated paths that perform well is desirable in order to improve link reliability by enabling a faster failover to diverse alternate beams in the case of blockage of the previous beam.

In some aspects, a device (e.g., device 1402, 1404, 1406) can evaluate the optimality of a selected beam in one complex channel measurement in the context of additional recent complex channel measurements to further enhance the quality of the complex channel measurement procedure, which can be especially useful in cases where multiple beams are assessed per complex channel measurement. In some aspects, the device may consider a range of factors in evaluating the optimality of a selected beam, for example, the optimality of each beam across multiple iterations of the complex channel measurement procedure, which can be useful in determining beams that balance optimal signal to noise ratio with reduced sensitivity to interference.

In some aspects, a device (e.g., device 1402, 1404, 1406) evaluates a subset of training fields and compares the results with a previous evaluation of the same training fields. If the device assesses the results to have a minimal delta in phase and/or amplitude across the subset of evaluated training fields, the device may assume that the channel conditions are sufficiently consistent with a previous complex channel measurement and the device may skip one or more remaining training field measurements to reduce overhead. In some aspects, a device uses complex channel measurement operations for beam tracking and determining an optimal beam within a spatial region. For example, the device (e.g., device 1402, 1404, 1406) can select one or more beams to be identified as candidates for optimality (e.g., using priori information) and perform complex channel measurements, using the device antenna (e.g., array), transceiver and processing circuitry, to determine detailed phase and amplitude information (e.g., phase and amplitude of signaling transmitted within the candidate beam). Subsequently, the device can then beam form and establish an optimal wireless communication link to another device, according to the complex channel measurements. Such aspects enable a device to perform beam tracking with less dependence on a system and system calibrations, such as phase offsets between tiled RFICs, as the device can use a beam identified through complex channel measurements (e.g., beam form according to the complex channel measurements) without requiring compensation for the assumed system calibration.

In certain aspects, a device can use complex channel measurements for calibration, for example, in a calibration procedure for determining an optimal beam in establishing a wireless communication link. Some aspects involve a device using priori information (e.g., received from a network node) about a beam to maximize the performance of a wireless communication link, for example, by selecting a particular beam based on the priori information. In certain aspects, a device can use priori information (e.g., known beam characteristics) in determining results of a complex channel measurement, and in solving for unknowns in a wireless communication system, such as the calibration of a system (e.g., one or more calibration parameters, calibration parameters in priori information). In certain aspects, priori information (e.g., calibration parameters within priori information) can also include, but is not limited to, factors such as a phase offset experienced per RFIC in a non-shared LO implementation, determining a per phase shifter error in each phase shifter state, or determining the per phase shifter insertion loss per phase shifter state.

In some cases, between two devices (e.g., devices 1402 and 1404), transmit and receive beams may be nonreciprocal. Some aspects may involve complex channel measurement operations for both a receive case and a transmit case. A receive case, for example, may involve a remote device transmitting a sequence of waveforms with a consistent beam (e.g., a Golay sequence in the case of 802.11ad/ay) while a local device creates different beams with phase shifter values corresponding to each entry in an invertible matrix. A transmit case, for example, may involve a local device transmitting a series of waveforms (e.g., consistent beam, Golay sequence), wherein the remote device uses phase shifter values corresponding to each entry in the invertible matrix and the remote device uses a consistent beam to receive and decode the waveforms. In some aspects, a device may apply a mathematical model for non-reciprocity of a wireless communication system for extrapolating a transmit calibration from a receive calibration or vice versa. In certain aspects, the device can also perform a receive calibration for more than one frequency (e.g., channels) to identify one or more unknown variables used to extrapolate the receive calibration to the transmit calibration or vice versa.

Certain practical deployment scenarios involving mmWave frequency bands exhibit significantly different channel conditions, resulting in substantially different beam tracking criteria in different environments. In some aspects, a device can evaluate certain factors, such as an angular variation in candidate beams, amplitude of an optimal beam, spatial distribution of near-optimal candidate beams, and time-series factors, such as the consistency of the measurements over time, to characterize a type of channel between a local and a remote endpoint (e.g., between two devices, devices 1402 and 1404). In some aspects, this information may also be fused with additional information including but not limited to accelerometer or location sensing measurements.

In addition to determining an optimal beam tracking (e.g., beam adaptation) operation, a device may also determine one or more tuning parameters. Such tuning parameters can include, but are not limited to, a periodicity and a percentage of a training field coverage. These parameters can help a device predict how effective various beam tracking operations will be (e.g., beam adaptations, adaptation parameters and/or tuning parameters). Beam tracking operations can include, but are not limited to, beam broadening and/or sidelobe suppression.

Figure 16:
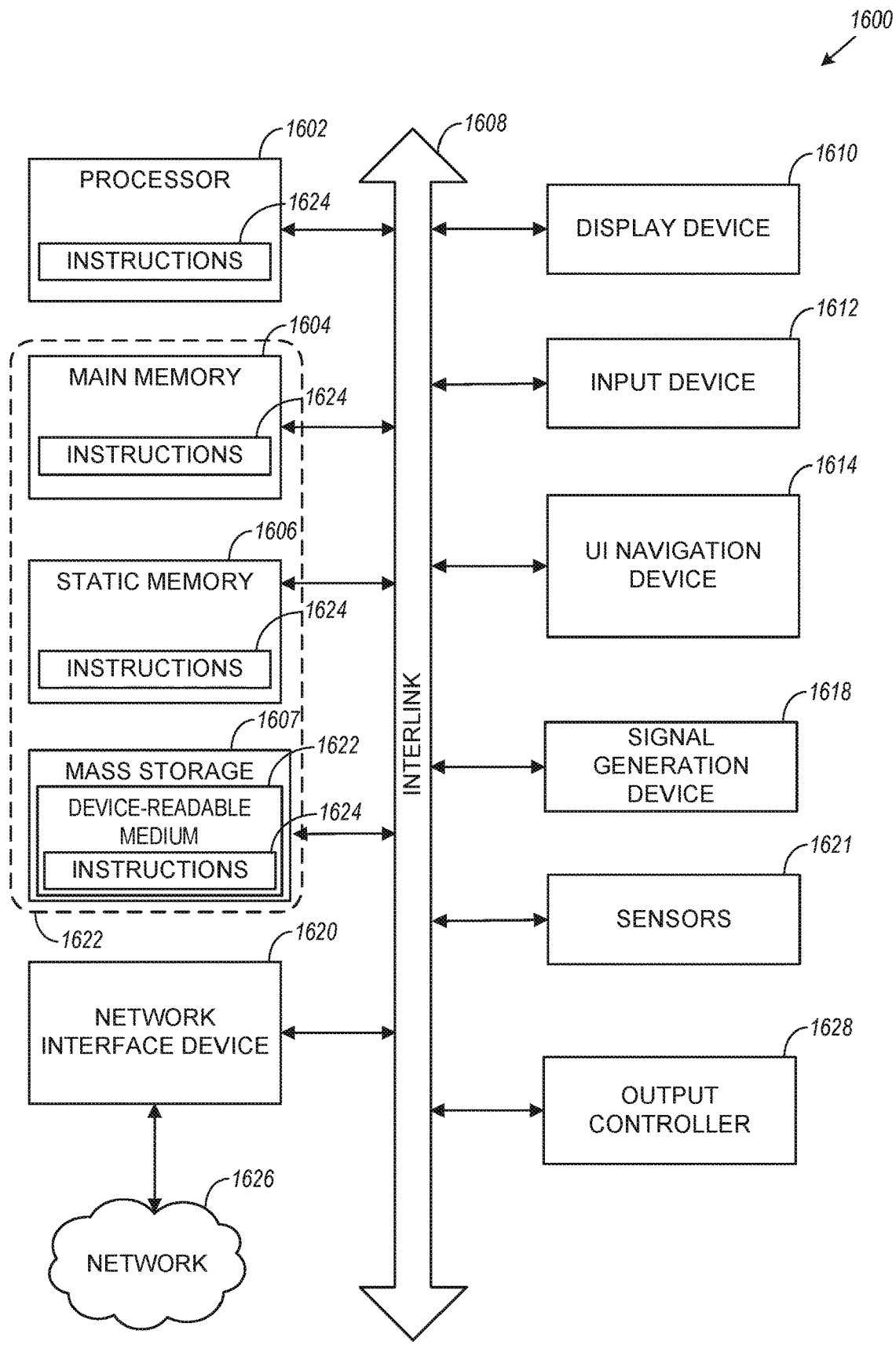
FIG. 16 is a block diagram illustrating an example of a machine upon which one or more aspects may be implemented.

FIG. 16 illustrates a block diagram of an example machine 1600 upon which any one or more of the techniques (e.g., methodologies) discussed herein may perform, for example, any of a spatial searching operation, a directional beam forming operation using priori information, an adaptive power savings operation, or a complex channel measurement operation for beam forming and for device and/or system calibration.

Examples, as described herein, may include, or may operate by, logic or a number of components, or mechanisms in the machine 1600. Circuitry (e.g., processing circuitry) is a collection of circuits implemented in tangible entities of the machine 1600 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1600 follow.

In alternative aspects, the machine 1600 may operate as a standalone device or may be connected (e.g., networked) to other machines. In a networked deploy meat, the machine 1600 may operate in the capacity of a server machine, a client machine, or both in server-client network environments. In an example, the machine 1600 may act as a peer machine in peer-to-peer (P2P) (or other distributed) network environment. The machine 1600 may be a personal computer (PC), a tablet PC, a set-top box (STB), a personal digital assistant (PDA), a mobile telephone, a web appliance, a network router, switch or bridge, or any machine capable of executing instructions (sequential or otherwise)

that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing software as a service (SaaS), other computer cluster configurations.

The machine (e.g., computer system) 1600 may include a hardware processor 1602 (e.g., a central processing unit (CPU), a graphics processing unit (GPU), a hardware processor core, or any combination thereof), a main memory 1604, a static memory (e.g., memory or storage for firmware, microcode, a basic-input-output (BIOS), unified extensible firmware interface (UEFI), etc.) 1606, and mass storage 1608 (e.g., hard drive, tape drive, flash storage, or other block devices) some or all of which may communicate with each other via an interlink (e.g., bus) 1630. The machine 1600 may further include a display unit 1610, an alphanumeric input device 1612 (e.g., a keyboard), and a user interface (UI) navigation device 1614 (e.g., a mouse). In an example, the display unit 1610, input device 1612 and UI navigation device 1614 may be a touch screen display. The machine 1600 may additionally include a storage device (e.g., drive unit) 1608, a signal generation device 1618 (e.g., a speaker), a network interface device 1620, and one or more sensors 1616, such as a global positioning system (GPS) sensor, compass, accelerometer, or other sensor. The machine 1600 may include an output controller 1628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1602, the main memory 1604, the static memory 1606, or the mass storage 1608 may be, or include, a machine readable medium 1622 on which is stored one or more sets of data structures or instructions 1624 (e.g., software) embodying or utilized by any one or more of the techniques or functions described herein. The instructions 1624 may also reside, completely or at least partially, within any of registers of the processor 1602, the main memory 1604, the static memory 1606, or the mass storage 1608 during execution thereof by the machine 1600. In an example, one or any combination of the hardware processor 1602, the main memory 1604, the static memory 1606, or the mass storage 1608 may constitute the machine readable media 1622. While the machine readable medium 1622 is illustrated as a single medium, the term "machine readable medium" may include a single medium or multiple media (e.g., a centralized or distributed database, and/or associated caches and servers) configured to store the one or more instructions 1624.

The term "machine readable medium" may include any medium that is capable of storing encoding or carrying instructions for execution by the machine 1600 and that cause the machine 1600 to perform any one or more of the techniques of the present disclosure, or that is capable of storing encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1624 may be further transmitted or received over a communications network 1626 using a transmission medium via the network interface device 1620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1620 may include one or more physical jacks (e.g., Ethernet, coaxial, or phone jacks) or one or more antennas to connect to the communications network 1626. In an example, the network interface device 1620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing encoding or carrying instructions for execution by the machine 1600, and includes digital or analog communications signals or other intangible medium to facilitate communication of such software. A transmission medium is a machine readable medium.

EXAMPLES

Although an aspect has been described with reference to specific example aspects, it will be evident that various modifications and changes may be made to these aspects without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, by the term "aspect" merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects, and other aspects not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

The following describes various examples of methods, machine-readable media, and systems (e.g., machines, devices, or other apparatus) discussed herein.

Example 1 is an apparatus of a wireless communication device, comprising: memory; and processing circuitry configured to: decode priori information from signaling received from a network node; modify a superset of beam criteria stored in the memory, according to the priori information, to obtain a subset of beam criteria; select a spatial region according to the subset of beam criteria for use in a spatial searching operation; and initiate the spatial searching operation in the spatial region.

In Example 2, the subject matter of Example 1 includes, wherein as part of the spatial searching operation, the processing circuitry is configured to: scan the selected spatial region in an order of directions indicated by the priori information; and determine a direction within the spatial region for use in establishing a directional communication link to a second wireless communication device.

In Example 3, the subject matter of Examples 1-2 includes, wherein as part of the spatial searching operation, the processing circuitry is configured to: select a subset of beams according to the subset of beam criteria; scan in one or more directions using the subset of beams; and determine a direction, according to the subset of beams, for use in establishing a directional communication link to a second wireless communication device.

In Example 4, the subject matter of Examples 1-3 includes, wherein as part of the spatial searching operation, the processing circuitry is configured to: calculate a set of antenna weight vectors to determine a beam for use in establishing a directional communication link to a second wireless communication device.

In Example 5, the subject matter of Examples 1-4 includes, wherein modifying the superset of beam criteria includes reducing the superset of beam criteria to obtain the subset of beam criteria.

In Example 6, the subject matter of Example 5 includes, wherein the superset of beam criteria includes a superset of spatial regions and modifying the superset of beam criteria includes reducing the superset of spatial regions to obtain the spatial region.

In Example 7, the subject matter of Examples 5-6 includes, wherein the superset of beam criteria includes a superset of beams and modifying the superset of beam criteria includes reducing the superset of beams to obtain the subset of beams.

In Example 8, the subject matter of Examples 1-7 includes, wherein the wireless communication device further comprises an antenna and a transceiver, the antenna and the transceiver configured to: receive the signaling from the network node; search the spatial region according to the subset of beam criteria; and establish a directional communication link to a second wireless communication device.

In Example 9, the subject matter of Examples 1-8 includes, wherein the priori information includes information from one or more of a first communication link, between the wireless communication device and the network node, or a second communication link, between another wireless communication device and the network node.

In Example 10, the subject matter of Example 9 includes, wherein at least one of the first communication link or the second communication link is a previous communication link.

In Example 11, the subject matter of Examples 1-10 includes, wherein the priori information indicates prioritization of the superset of beam criteria and wherein the processing circuitry is configured to modify the superset of beam criteria to obtain the subset of beam criteria in accordance with the prioritization.

In Example 12, the subject matter of Examples 1-11 includes, wherein the priori information indicates one or more of location coordinates of the spatial region, location statistics, device characteristics, or calibration parameters.

In Example 13, the subject matter of Examples 8-12 includes, wherein the processing circuitry is configured to: configure the wireless communication device for a complex channel measurement operation, wherein as part of the complex channel measurement operation, the processing circuitry is configured to: configure the antenna and the transceiver to receive signaling, the signaling including a training field; obtain a measurement of the training field; derive a phase shifter value of the training field from an invertible matrix; and invert the phase shifter value to determine a phase and an amplitude relative to an antenna element of the antenna.

In Example 14, the subject matter of Example 13 includes, wherein the processing circuitry is configured to: identify a candidate beam according to the subset of beam criteria; configure the antenna and the transceiver to receive signaling in the candidate beam; and determine a complex channel measurement of the signaling from the candidate beam, including a phase and amplitude of the signaling from the candidate beam, relative to the antenna element.

In Example 15, the subject matter of Examples 13-14 includes, wherein the processing circuitry is configured to determine a calibration parameter using the priori information and the phase and the amplitude relative to the antenna element.

Example 16 is an apparatus of a network node, comprising: memory; and processing circuitry configured to: estimate location coordinates of a first wireless communication device based on a first directional communication link between the network node and the first wireless communication device; estimate location coordinates of a second wireless communication device based on a second directional communication link between the network node and the second wireless communication device, wherein the network node is a reference origin for the location coordinates of the first wireless communication device and the location coordinates of the second wireless communication device; calculate location coordinates of a spatial region between the first wireless communication device and the second wireless communication device based on the location coordinates of the first wireless communication device and the location coordinates of the second wireless communication device; based on the location coordinates of the spatial region, encode first priori information for transmission to the first wireless communication device and second priori information for transmission to the second wireless communication device.

In Example 17, the subject matter of Example 16 includes, wherein the first priori information and the second priori information indicate one or more of location coordinates of the spatial region, location statistics, device characteristics, or prioritization for searching the location coordinates of the spatial region.

In Example 18, the subject matter of Examples 16-17 includes, wherein the network node further comprises an antenna and a transceiver, the antenna and the transceiver configured to transmit the first priori information to the first wireless communication device and the second priori information to the second wireless communication device, for establishing a directional communication link between the first wireless communication device and the second wireless communication device.

In Example 19, the subject matter of Examples 16-18 includes, wherein the first priori information and the second priori information include the same information.

In Example 20, the subject matter of Examples 16-19 includes, wherein at least one of the first directional communication link or the second directional communication link is a previous directional communication link.

Example 21 is an apparatus of a wireless communication device, comprising: antenna front end (AFE) circuitry to provide signals from Nr antennas using K1 input/output (IO) links; and radio frequency (RF) circuitry to: receive signals over K1 IO links; and combine signals received over the K1 IO links, using a compression matrix, to generate signals over K IO links, wherein K is less than or equal to K1.

In Example 22, the subject matter of Example 21 includes, baseband circuitry, and wherein the compression matrix is received from the baseband circuitry.

In Example 23, the subject matter of Examples 21-22 includes, wherein the K1 IO links are provided by first stage compression circuitry, and wherein the first stage compression circuitry performs compression of signals received from the AFE using a second compression matrix based on Nr.

In Example 24, the subject matter of Examples 22-23 includes, wherein the apparatus comp rises a plurality of radio frequency (RF) chains each including RF circuitry coupled to a panel, wherein a panel includes at least two IO links coupled to antenna circuitry, and wherein the baseband circuitry includes control circuitry to activate or deactivate a set of RF chains of the plurality of RF chains based on physical layer or higher layer control signals.

In Example 25, the subject matter of Example 24 includes, wherein the apparatus includes a plurality of panels, and wherein control circuitry is further configured to activate or deactivate panels of the plurality of panels based on physical layer or higher layer control signals.

In Example 26, the subject matter of Example 25 includes, wherein the control circuitry is further configured to perform activation or deactivation based on resource allocation information provided in physical layer or higher layer control signals.

Example 27 is a computer-readable hardware storage device that stores instructions for execution by one or more processors of a wireless communication device, the instructions to configure the one or more processors to: decode priori information from signaling received from a network node; modify a superset of beam criteria, according to the priori information, to obtain a subset of beam criteria; select a spatial region according to the subset of beam criteria for use in a spatial searching operation; and initiate the spatial searching operation in the spatial region.

In Example 28, the subject matter of Example 27 includes, wherein the instructions are to further configure the one or more processors to configure the wireless communication device for a complex channel measurement operation, the complex channel measurement operation including: configure the antenna and the transceiver to receive signaling, the signaling including a training field; obtain a measurement of the training field; derive a phase shifter value of the training field from an invertible matrix; and invert the phase shifter value to determine a phase and an amplitude relative to an antenna element of the antenna.

Example 29 is at least one machine-readable medium including instructions that, when executed by processing circuitry, cause the processing circuitry to perform operations to implement of any of Examples 1-28.

Example 30 is an apparatus comprising means to implement of any of Examples 1-28.

Example 31 is a system to implement of any of Examples 1-28.

Example 32 is a method to implement of any of Examples 1-28.

What is claimed is:

1. An apparatus of a wireless communication device, comprising:
   memory; and
   processing circuitry configured to:
   decode priori information from signaling received from a network node;
   modify a superset of beam criteria stored in the memory, according to the priori information, to obtain a subset of beam criteria;
   select a spatial region according to the subset of beam criteria for use in a spatial searching operation; and
   initiate the spatial searching operation in the spatial region,
   wherein as part of the spatial searching operation, the processing circuitry is configured to:
   scan the selected spatial region in an order of directions indicated by the priori information; and determine a direction within the spatial region for use in establishing a directional communication link to a second wireless communication device.

2. The apparatus of claim 1, wherein as part of the spatial searching operation, the processing circuitry is configured to:
calculate a set of antenna weight vectors to determine a beam for use in establishing a directional communication link to a second wireless communication device.

3. The apparatus of claim 1, wherein modifying the superset of beam criteria includes reducing the superset of beam criteria to obtain the subset of beam criteria.

4. The apparatus of claim 3, wherein the superset of beam criteria includes a superset of spatial regions and modifying the superset of beam criteria includes reducing the superset of spatial regions to obtain the spatial region.

5. The apparatus of claim 3, wherein the superset of beam criteria includes a superset of beams and modifying the superset of beam criteria includes reducing the superset of beams to obtain the subset of beams.

6. The apparatus of claim 1, wherein the wireless communication device further comprises an antenna and a transceiver, the antenna and the transceiver configured to:
receive the signaling from the network node;
search the spatial region according to the subset of beam criteria; and
establish a directional communication link to a second wireless communication device.

7. The apparatus of claim 6, wherein the processing circuitry is configured to:
configure the wireless communication device for a complex channel measurement operation, wherein as part of the complex channel measurement operation, the processing circuitry is configured to:
configure the antenna and the transceiver to receive signaling, the signaling including a training field;
obtain a measurement of the training field;
derive a phase shifter value of the training field from an invertible matrix; and
invert the phase shifter value to determine a phase and an amplitude relative to an antenna element of the antenna.

8. The apparatus of claim 7, wherein the processing circuitry is configured to:
identify a candidate beam according to the subset of beam criteria;
configure the antenna and the transceiver to receive signaling in the candidate beam; and
determine a complex channel measurement of the signaling from the candidate beam, including a phase and amplitude of the signaling from the candidate beam, relative to the antenna element.

9. The apparatus of claim 7, wherein the processing circuitry is configured to determine a calibration parameter using the priori information and the phase and the amplitude relative to the antenna element.

10. The apparatus of claim 1, wherein the priori information includes information from one or more of a first communication link, between the wireless communication device and the network node, or a second communication link, between another wireless communication device and the network node.

11. The apparatus of claim 10, wherein at least one of the first communication link or the second communication link is a previous communication link.

12. The apparatus of claim 1, wherein the priori information indicates prioritization of the superset of beam criteria and wherein the processing circuitry is configured to modify the superset of beam criteria to obtain the subset of beam criteria in accordance with the prioritization.

13. The apparatus of claim 1, wherein the priori information indicates one or more of location coordinates of the spatial region, location statistics, device characteristics, or calibration parameters.

14. An apparatus of a wireless communication device, comprising:
memory; and
processing circuitry configured to:
decode priori information from signaling received from a network node;
modify a superset of beam criteria stored in the memory, according to the priori information, to obtain a subset of beam criteria;
select a spatial region according to the subset of beam criteria for use in a spatial searching operation; and
initiate the spatial searching operation in the spatial region,
wherein as part of the spatial searching operation, the processing circuitry is configured to:
select a subset of beams according to the subset of beam criteria;
scan in one or more directions using the subset of beams; and
determine a direction, according to the subset of beams, for use in establishing a directional communication link to a second wireless communication device.

15. An apparatus of a network node, comprising:
memory; and
processing circuitry configured to:
estimate location coordinates of a first wireless communication device based on a first directional communication link between the network node and the first wireless communication device;
estimate location coordinates of a second wireless communication device based on a second directional communication link between the network node and the second wireless communication device, wherein the network node is a reference origin for the location coordinates of the first wireless communication device and the location coordinates of the second wireless communication device;
calculate location coordinates of a spatial region between the first wireless communication device and the second wireless communication device based on the location coordinates of the first wireless communication device and the location coordinates of the second wireless communication device;
based on the location coordinates of the spatial region, encode first priori information for transmission to the first wireless communication device and second priori information for transmission to the second wireless communication device.

16. The apparatus of claim 15, wherein the first priori information and the second priori information indicate one or more of location coordinates of the spatial region, location statistics, device characteristics, or prioritization for searching the location coordinates of the spatial region.

17. The apparatus of claim 15, wherein the network node further comprises an antenna and a transceiver, the antenna and the transceiver configured to transmit the first priori information to the first wireless communication device and the second priori information to the second wireless communication device, for establishing a directional communication link between the first wireless communication device and the second wireless communication device.

18. The apparatus of claim 15, wherein the first priori information and the second priori information include the same information.

19. The apparatus of claim 15, wherein at least one of the first directional communication link or the second directional communication link is a previous directional communication link.

20. A computer-readable hardware storage device that stores instructions for execution by one or more processors of a wireless communication device, the instructions to configure the one or more processors to:

decode priori information from signaling received from a network node;

modify a superset of beam criteria, according to the priori information, to obtain a subset of beam criteria;

select a spatial region according to the subset of beam criteria for use in a spatial searching operation; and initiate the spatial searching operation in the spatial region, wherein the instructions are to further configure the one or more processors to configure the wireless communication device for a complex channel measurement operation, the complex channel measurement operation including:

configure the antenna and the transceiver to receive signaling, the signaling including a training field;

obtain a measurement of the training field;

derive a phase shifter value of the training field from an invertible matrix; and invert the phase shifter value to determine a phase and an amplitude relative to an antenna element of the antenna.

* * * * *